`US008648544B2`

(12) United States Patent
Sasakawa et al.

(10) Patent No.: US 8,648,544 B2
(45) Date of Patent: Feb. 11, 2014

(54) ILLUMINATION LIGHTING APPARATUS, ILLUMINATION APPARATUS, AND ILLUMINATION SYSTEM

(75) Inventors: Tomohiro Sasakawa, Ibaraki (JP); Naoki Onishi, Kobe (JP); Masafumi Yamamoto, Osaka (JP); Keisuke Ueda, Hirakata (JP); Katsunobu Hamamoto, Neyagawa (JP); Kei Mitsuyasu, Hirakata (JP)

(73) Assignee: Panasonic Corporation, Osaka (JP)

( * ) Notice: Subject to any disclaimer, the term of this patent is extended or adjusted under 35 U.S.C. 154(b) by 567 days.

(21) Appl. No.: 12/999,737

(22) PCT Filed: Jun. 15, 2009

(86) PCT No.: PCT/JP2009/060896
§ 371 (c)(1),
(2), (4) Date: Dec. 17, 2010

(87) PCT Pub. No.: WO2009/154180
PCT Pub. Date: Dec. 23, 2009

(65) Prior Publication Data
US 2011/0095698 A1    Apr. 28, 2011

(30) Foreign Application Priority Data

Jun. 20, 2008 (JP) .............................. P2008-161900
Aug. 26, 2008 (JP) .............................. P2008-216290

(51) Int. Cl.
*H05B 41/16* (2006.01)

(52) U.S. Cl.
USPC ........ 315/287; 315/209 R; 315/291; 315/293; 315/360

(58) Field of Classification Search
USPC ...... 315/209 R, 224, 287, 291, 293, 299, 360
See application file for complete search history.

(56) References Cited

U.S. PATENT DOCUMENTS 5,357,170 A    10/1994    Luchaco et al.
7,233,311 B2 *    6/2007    Okubo et al. ................. 345/108
(Continued)

FOREIGN PATENT DOCUMENTS

GB    2444527    6/2008
JP    6-76967    3/1994
(Continued)

OTHER PUBLICATIONS

International Search Report, dated Aug. 18, 2009.
(Continued)

*Primary Examiner* — Douglas W Owens
*Assistant Examiner* — Thai Pham
(74) *Attorney, Agent, or Firm* — Greenblum & Bernstein, P.L.C.

(57) ABSTRACT

An illumination lighting apparatus is connected to, as an external apparatus, any of a human body sensing sensor configured to detect presence/absence of a person, an illuminance sensor configured to detect space illuminance, and a dimmer which arbitrarily adjusts the space illuminance, and is configured to produce an output control signal for controlling an optical output of a light source based on a signal output from the external apparatus. The illumination lighting apparatus includes: an external apparatus determining unit configured to determine which kind of the external apparatus is connected based on the signal output from the external apparatus; and a signal processing unit configured to produce the output control signal based on the signal output from the external apparatus.

12 Claims, 32 Drawing Sheets

(56) References Cited

U.S. PATENT DOCUMENTS

| | | |
|---|---|---|
| 7,425,802 B2 | 9/2008 | Kumagai et al. |
| 2003/0065472 A1 | 4/2003 | Eckel et al. |
| 2006/0158131 A1* | 7/2006 | Mitsuyasu et al. ........ 315/209 R |
| 2007/0296355 A1* | 12/2007 | Hamamoto et al. .......... 315/309 |
| 2010/0039581 A1 | 2/2010 | Mishima et al. |
| 2010/0176739 A1 | 7/2010 | Naruo |
| 2010/0207532 A1 | 8/2010 | Mans |
| 2012/0326611 A1* | 12/2012 | Nanahara et al. ............. 315/151 |

FOREIGN PATENT DOCUMENTS

| | | |
|---|---|---|
| JP | 6-163161 | 6/1994 |
| JP | 7-122374 | 5/1995 |
| JP | 9-63772 | 3/1997 |
| JP | 9-283294 | 10/1997 |
| JP | 11-185973 | 7/1999 |
| JP | 2000-357593 | 12/2000 |
| JP | 2001-93694 | 4/2001 |
| JP | 2001-291597 | 10/2001 |
| JP | 2002-289378 | 10/2002 |
| JP | 2004-31046 | 1/2004 |
| JP | 2007-035553 | 2/2007 |
| JP | 2007-066629 | 3/2007 |
| JP | 2008-108749 | 5/2008 |

OTHER PUBLICATIONS

Extended European Search Report from E.P.O., mailed Dec. 27, 2011, for corresponding European Patent Application 09766628.3.

* cited by examiner

FIG. 27 (A)  PRIOR ART
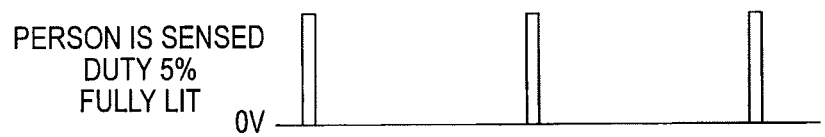
PERSON IS SENSED
DUTY 5%
FULLY LIT
FIG. 27 (B)  PRIOR ART
NOT SENSED
DUTY 100%
LIT-OFF
FIG. 27 (C)  PRIOR ART
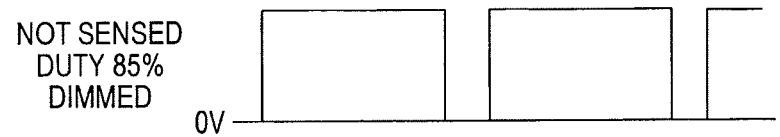
NOT SENSED
DUTY 85%
DIMMED

PRIOR ART

FIG. 30 (A) PRIOR ART
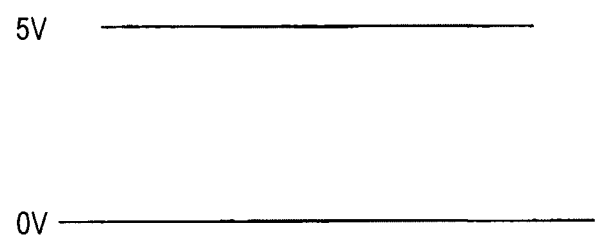
FIG. 30 (B) PRIOR ART
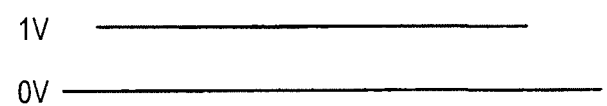

FIG. 31 (A) PRIOR ART
DARK
DUTY 5%
FULLY LIT
FIG. 31 (B) PRIOR ART
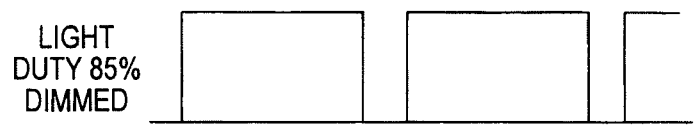
LIGHT
DUTY 85%
DIMMED
FIG. 32 PRIOR ART
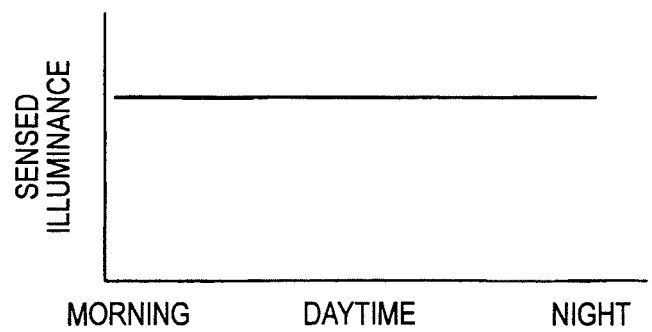

PRIOR ART

FIG. 34 (A)  PRIOR ART
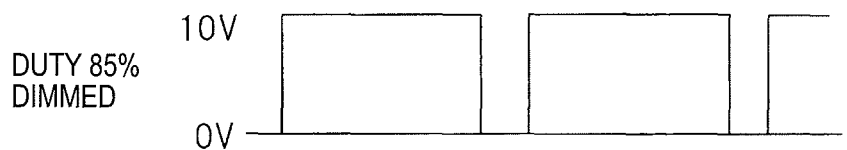
FIG. 34 (B)  PRIOR ART
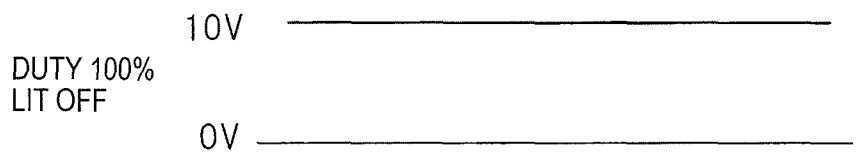
FIG. 34 (C)  PRIOR ART & ILLUMINATION LIGHTING APPARATUS, ILLUMINATION APPARATUS, AND ILLUMINATION SYSTEM

TECHNICAL FIELD

The present invention relates to an illumination lighting apparatus which is connected to external apparatuses such as a human body sensing sensor, an illuminance sensor, and a dimmer are connected, and which controls lighting-ON, lighting-OFF, and dimming of a light source, illumination apparatus, and illumination system.

BACKGROUND ART

Conventionally, there is known an illumination system which uses a human body sensing sensor, and which is lit with high illuminance when it is sensed that a person is present, and which is lit with low illuminance or lit OFF when it is sensed that a person is absent (for example, see Patent Document 1).

FIG. 25 is a view showing a schematic configuration of such an illumination system. Referring to the drawing, a signal indicative of the presence/absence of a person detected by a human body sensing sensor 31 is sent to a sensor control block 32. As shown in FIG. 26, for example, the signal indicative of the presence/absence of a person is a pulse signal which is at the H level when a person is sensed and which is at the L level when a person is not sensed. When the signal is input, for example, the sensor control block 32 outputs a dimming signal which is pulse width modulated (PWM) such as shown in FIG. 27, to an illumination lighting apparatus 33 such as an electronic ballast.

When a person is sensed, as shown in FIG. 27(A), a PWM signal having a duty of 5% by which a discharge lamp 34 is fully lit is output to the illumination lighting apparatus 33, and, when a person is not sensed, as shown in FIG. 27(B) and (C), a PWM signal having a duty of 100% by which the discharge lamp 34 is lit OFF, or that having a duty of 85% by which the discharge lamp is lit with low illuminance is output to the illumination lighting apparatus 33.

The sensor control block 32 sets also a lighting holding time after a person is sensed, and a controls the discharge lamp 34 so that it is not lit OFF immediately after a person is absent, but holds lighting for, for example, several minutes as shown in FIG. 28. This control is preformed because of the following reason. In an illumination system for a stairway or the like, when a lamp is lit OFF immediately after a person is absent, for example, it is sometimes difficult to ascend or descend stairs.

Moreover, there is an illumination system in which the ambient brightness due to daylight is detected by using an illuminance sensor, and an illumination apparatus is automatically controlled to an appropriate light amount in accordance with the detected brightness. In the illumination system, when it is light outdoors, the illumination apparatus is lit with low illuminance, and, when it is dark outdoors, the illumination apparatus is lit with high illuminance, thereby obtaining an illumination environment where the brightness is always constant (for example, see Patent Documents 1 and 2).

FIG. 29 is a view showing a schematic configuration of an illumination system using an illuminance sensor. Referring to the figure, a brightness signal which is detected by an illuminance sensor 41, or, for example, a DC signal which, as shown in FIG. 30(A) and (B), when it is light, is 5 V, and, when it is dark, is 1 V is sent to a sensor control block 42. In accordance with the signal input from the illuminance sensor 41, the sensor control block 42 outputs, for example, a PWM dimming signal such as shown in FIG. 31, to an illumination lighting apparatus 43.

In the case where the illuminance sensor 41 detects that the ambient brightness is dark, a PWM signal having a duty of 5% by which the discharge lamp 34 is fully lit is output to the illumination lighting apparatus 43 as shown in FIG. 31(A), and, in the case where it is detected that the ambient brightness is light, a PWM signal having a duty of 85% is output to the illumination lighting apparatus 43 as shown in FIG. 31(B) to dim so that the optical output of the discharge lamp 34 is reduced. In accordance with the ambient brightness detected by the illuminance sensor 41, for example, the space illuminance can be controlled so as to be substantially constant at any time of the day or night as shown in FIG. 32. When the relationship between the output signal of the illuminance sensor 41 and the dimming signal of the sensor control block 42 is arbitrarily adjusted, it is possible to change the space illuminance to be controlled.

Furthermore, there is an example of a dimmer in which, in order to arbitrarily adjust the brightness of an illumination environment, a PWM signal is output to an illumination lighting apparatus.

FIG. 33 is a view showing a schematic configuration of an illumination system in which the brightness of an illumination environment is controlled by using a dimmer. Referring to the figure, a PWM signal which is output from a dimmer 51 is input to an illumination lighting apparatus 53. In the case where the ON duty ratio of the PWM signal is small as shown in FIG. 34(A), the illumination lighting apparatus 53 increases the optical output of the discharge lamp 34, and, in the case where the ON duty ratio is large as shown in FIG. 34(B), the illumination lighting apparatus 53 decreases the optical output of the discharge lamp 34. In the case where the ON duty ratio is 100% as shown in FIG. 34(C), the illumination lighting apparatus 53 lights OFF the discharge lamp 34. In this way, a person adjusts the volume of the dimmer 51 to change the duty ratio of the PWM signal which is output from the dimmer 51, whereby desired illuminance can be obtained.

As described above, in a conventional illumination system in which external apparatuses such as a human body sensing sensor, an illuminance sensor, and a dimmer are used, signal modes and illumination controls such as lighting-ON, lighting-OFF, and dimming are different, and hence it is usual to individually dispose sensor control blocks which correspond thereto, respectively.

When a sensor control block is individually disposed for each of external apparatuses, the cost is increased, and a problem in that the general versatility is poor is caused.

PRIOR ART DOCUMENT

Patent Document

Patent Document 1: JP-A-09-63772
Patent Document 2: JP-A-11-185973
Patent Document 3: JP-A-2001-93694

DISCLOSURE OF THE INVENTION

Problems to be Solved by the Invention

The invention has been conducted in view of the above-described circumstances. It is an object of the invention to provide an illumination lighting apparatus, illumination apparatus, and illumination system in which, in the case where external apparatuses such as a human body sensing sensor, an illuminance sensor, and a dimmer are connected and an illumination control is performed, the cost is not increased, and the general versatility can be improved.

It is another object of the invention to provide an illumination lighting apparatus which can supply a larger preheating current in a short preheating time. It is a further object of the invention to provide an illumination lighting apparatus in which the power consumption is reduced during a lamp lighting time and a waiting and preheating time, and energy saving can be performed.

Means for Solving the Problems

As a first aspect, the invention provides an illumination lighting apparatus which is connected to, as an external apparatus, any of a human body sensing sensor configured to detect presence/absence of a person, an illuminance sensor configured to detect space illuminance, and a dimmer which arbitrarily adjusts the space illuminance, and which is configured to produce an output control signal for controlling an optical output of a light source based on a signal output from the external apparatus, said illumination lighting apparatus comprising: an external apparatus determining unit configured to determine which kind of the external apparatus is connected based on the signal output from the external apparatus; and a signal processing unit configured to produce the output control signal based on the signal output from the external apparatus.

According to the configuration, it is possible to provide an illumination lighting apparatus which can automatically determine the connected external apparatus, which can perform an adequate lighting control corresponding to the external apparatus, and in which the general versatility is high. Moreover, it is not required to dispose a sensor control block for each of external apparatuses. Therefore, the configuration is simplified, and the cost can be suppressed.

As a second aspect, the invention includes the above-described illumination lighting apparatus wherein the signal output from the external apparatus comprises: an external-apparatus determination signal unique to the external apparatus; and a lighting operation control signal for controlling a lighting operation of the light source and unique to the external apparatus, wherein the external apparatus determining unit determines the kind of the external apparatus based on the external-apparatus determination signal, and informs the signal processing unit of the determined kind, and wherein the signal processing unit produces the output control signal based on the lighting operation control signal so as to correspond to the informed kind of the external apparatus.

According to the configuration, it is possible to provide an illumination lighting apparatus which can automatically determine the connected external apparatus, which can perform an adequate lighting control corresponding to the external apparatus, and in which the general versatility is high.

As a third aspect, the invention includes the above-described illumination lighting apparatus wherein the signal output from the external apparatus comprises the lighting operation control signal, wherein the external apparatus determining unit determines the kind of the connected external apparatus based on the lighting operation control signal, and informs the signal processing unit of the determined kind, and wherein the signal processing unit produces the output control signal based on the lighting operation control signal so as to correspond to the informed kind of the external apparatus.

According to the configuration, it is not required to specially dispose a signal line for determining the connected external apparatus, and the connected external apparatus is determined by using only the lighting operation control signal. Therefore, it is possible to provide an illumination lighting apparatus which can cope with an existing external apparatus, and in which the cost is not increased, and the general versatility is high.

As a fourth aspect, the invention includes the above-described illumination lighting apparatus wherein a signal form of the lighting operation control signal output from the human body sensing sensor is a binary signal for lighting ON or OFF the light source in accordance with the presence/absence of the person, wherein a signal form of the lighting operation control signal output from the illuminance sensor is a DC voltage which is changed in accordance with the space illuminance and controls the output of the light source so as to make the space illuminance constant, wherein a signal form of the lighting operation control signal output from the dimmer is a PWM signal in which a duty ratio is changed to control the output of the light source and of which a frequency for controlling the space illuminance to a desired value is constant, and wherein the external apparatus determining unit determines the kind of the external apparatus depending on which one of the signal forms is used in the lighting operation control signal.

According to the configuration, it is possible to provide an illumination lighting apparatus which can automatically determine the connected external apparatus, which can perform an adequate lighting control corresponding to the external apparatus, and in which the general versatility is high.

As a fifth aspect of the invention, the invention includes the above-described illumination lighting apparatus in which the light source is a discharge lamp, wherein the illumination lighting apparatus comprises: a preheating circuit configured to supply a preheating current to an electrode of the discharge lamp such that a supply amount of the preheating current can be switched in a plurality of steps having at least a first preheating current and a second preheating current; a timer unit configured to set a preheating time in which the preheating current is supplied to the preheating circuit; and a preheating controlling unit configured to switch the supply amount of the preheating current output from the preheating circuit, wherein in relighting after lighting-OFF of the discharge lamp, the preheating controlling unit switches the preheating circuit so as to supply the second preheating current as a relighting preheating current which is larger than the first preheating current supplied at lighting.

According to the configuration, when the discharge lamp is to be re-lit after lighting-OFF, a larger preheating current can be supplied for a short preheating time. When a less preheating current is supplied in lighting or the like, the power consumption can be reduced and energy saving can be performed. Therefore, a preheating current which is optimum for the discharge lamp can be set so that the time elapsed until lighting can be shortened and the power consumption can be reduced.

As a sixth aspect of the invention, the invention includes the above-described illumination lighting apparatus wherein in lighting-OFF of the discharge lamp, the preheating controlling unit switches the preheating circuit so as to supply the first preheating current as a lighting-OFF preheating current which is smaller than the second preheating current.

According to the configuration, when the supply of the small preheating current is continued after lighting-OFF, the power consumption can be reduced, and, when the discharge lamp is to be re-lit, the time elapsed before lighting-ON can be shortened.

As a seventh aspect of the invention, the invention includes the above-described illumination lighting apparatus wherein the timer unit sets a preheating stop time at which the supply of the preheating current is stopped, and wherein after the preheating stop time has elapsed in lighting-OFF of the discharge lamp, the preheating controlling unit stops the supply of the lighting-OFF preheating current from the preheating circuit.

According to the configuration, after the preheating stop time has elapsed, the supply of the preheating current is stopped, whereby the increase of the power consumption can be suppressed.

As an eighth aspect of the invention, the invention includes the above-described illumination lighting apparatus wherein the timer unit sets a first lighting preheating time and a second lighting preheating time as the preheating time, and wherein when the power supply is turned ON, the preheating controlling unit switches the preheating circuit so as to supply the first preheating current as a first lighting preheating current until the first lighting preheating time has elapsed, and to supply the second preheating current as a second lighting preheating current which is larger than the first preheating current until the second lighting preheating time has elapsed after elapse of the first lighting preheating time.

According to the configuration, when the power supply is turned ON, the preheating current is stepwisely increased, whereby a problem in that the life of the discharge lamp is shortened can be avoided.

As a ninth aspect of the invention, the invention includes the above-described illumination lighting apparatus wherein after the discharge lamp is lit, the preheating controlling unit switches the preheating circuit so as to supply the first preheating current as a preheating current during lighting which is smaller than the second preheating current.

According to the configuration, a small preheating current is supplied during lighting, whereby the power consumption during lighting of the discharge lamp can be reduced.

As a tenth aspect of the invention, the invention includes the above-described illumination lighting apparatus wherein the timer unit sets a time for supplying the relighting preheating current in relighting after lighting OFF of the discharge lamp to 0.5 seconds or shorter.

According to the configuration, the time elapsed until relighting of the discharge lamp can be shortened. Therefore, a disadvantage such as that, when a discharge lamp is disposed in a place where people come and go, such as a corridor, the discharge lamp is lit after a person has passed over can be prevented from occurring.

As an eleventh aspect of the invention, the invention includes the above-described illumination lighting apparatus wherein the timer unit comprises a number counter unit configured to count a number of operations of supplying the second preheating current or a number of lighting-OFF signals based on the external signal, and wherein in accordance with the number, at least one of a supply time for supplying the second preheating current and a level of the second preheating current is changed.

According to the configuration, in the case, e.g., of increase in the number of supplies of the second preheating current or increase in the number of the lighting-OFF signals, the preheating time is prolonged or the level of the preheating current is increased, whereby the electrodes of the discharge lamp can be sufficiently heated, so that a problem in that the life of the discharge lamp is shortened can be avoided.

As a twelfth aspect of the invention, the invention includes the above-described illumination lighting apparatus wherein the timer unit comprises a time counter unit configured to count the lighting time of the discharge lamp, and wherein in accordance with the lighting time, at least one of a supply time for supplying the second preheating current and a level of the second preheating current is changed.

According to the configuration, in the case, e.g., where the accumulated lighting time is long, the preheating time is prolonged or the level of the preheating current is increased, whereby the electrodes of the discharge lamp can be sufficiently heated, so that a problem in that the life of the discharge lamp is shortened can be avoided.

As a thirteenth aspect, the invention provides an illumination apparatus comprising: one of the above-described illumination lighting apparatuses; and the light source lit by an electric power supplied from the illumination lighting apparatus.

According to the configuration, it is possible to provide an illumination apparatus which can automatically determine the connected external apparatus, which can perform an adequate lighting control corresponding to the external apparatus, and in which the general versatility is high.

As a fourteenth aspect, the invention provides an illumination system comprising: the above-described illumination apparatus; and an external apparatus connected to the illumination apparatus.

According to the configuration, it is possible to provide an illumination system which can automatically determine the connected external apparatus, which can perform an adequate lighting control corresponding to the external apparatus, and in which the general versatility is high.

Advantages of the Invention

According to the invention, it is possible to provide an illumination lighting apparatus, illumination apparatus, and illumination system in which, in the case where external apparatuses such as a human body sensing sensor, an illuminance sensor, and a dimmer are connected and an illumination control is performed, the cost is not increased, and the general versatility can be improved.

According to the invention, moreover, it is possible to provide an illumination lighting apparatus which can supply a larger preheating current in a short preheating time. Furthermore, the invention can provide an illumination lighting apparatus in which the power consumption is reduced during a lamp lighting time and a waiting and preheating time, and energy saving can be performed.

BRIEF DESCRIPTION OF DRAWINGS

FIG. 27(A) is a view showing a signal which is output from the sensor control block to an illumination lighting apparatus in the case where a person is sensed by the human body sensing sensor, in the conventional illumination system, FIG. 27(B) is a view showing a signal which is output from the sensor control block to the illumination lighting apparatus in the case where a person is not sensed by the human body sensing sensor, in the conventional illumination system, and FIG. 27(C) is a view showing a signal which is output from the sensor control block to the illumination lighting apparatus in the case where a person is not sensed by the human body sensing sensor, in the conventional illumination system.

FIG. 30(A) is a view showing a signal which is output from the illuminance sensor to the sensor control block in the case where the environment is light, in the conventional illumination system, and FIG. 30(B) is a view showing a signal which is output from the illuminance sensor to the sensor control block in the case where the environment is dark, in the conventional illumination system.

FIG. 31(A) is a view showing a signal which is output from the sensor control block to a illumination lighting apparatus in the case where the environment is dark, in the conventional illumination system, and FIG. 31(B) is a view showing a signal which is output from the sensor control block to the illumination lighting apparatus in the case where the environment is dark, in the conventional illumination system.

FIG. 32 is a view showing a manner in which the space illuminances of day and night are controlled to be constant by using the illuminance sensor in the conventional illumination system.

FIG. 34(A) is a view showing a signal which is output from the dimmer to the sensor control block in the case where a lamp is fully lit, in the conventional illumination system, FIG. 34(B) is a view showing a signal which is output from the dimmer to the sensor control block in the case where lighting is dimmed, in the conventional illumination system, and FIG. 34(C) is a view showing a signal which is output from the dimmer to the sensor control block in the case where the lamp is lit OFF, in the conventional illumination system.

BEST MODE FOR CARRYING OUT THE INVENTION

Hereinafter, an illumination lighting apparatus, illumination apparatus, and illumination system of embodiments of the invention will be described with reference to the drawings.

First Embodiment

Figure 1:
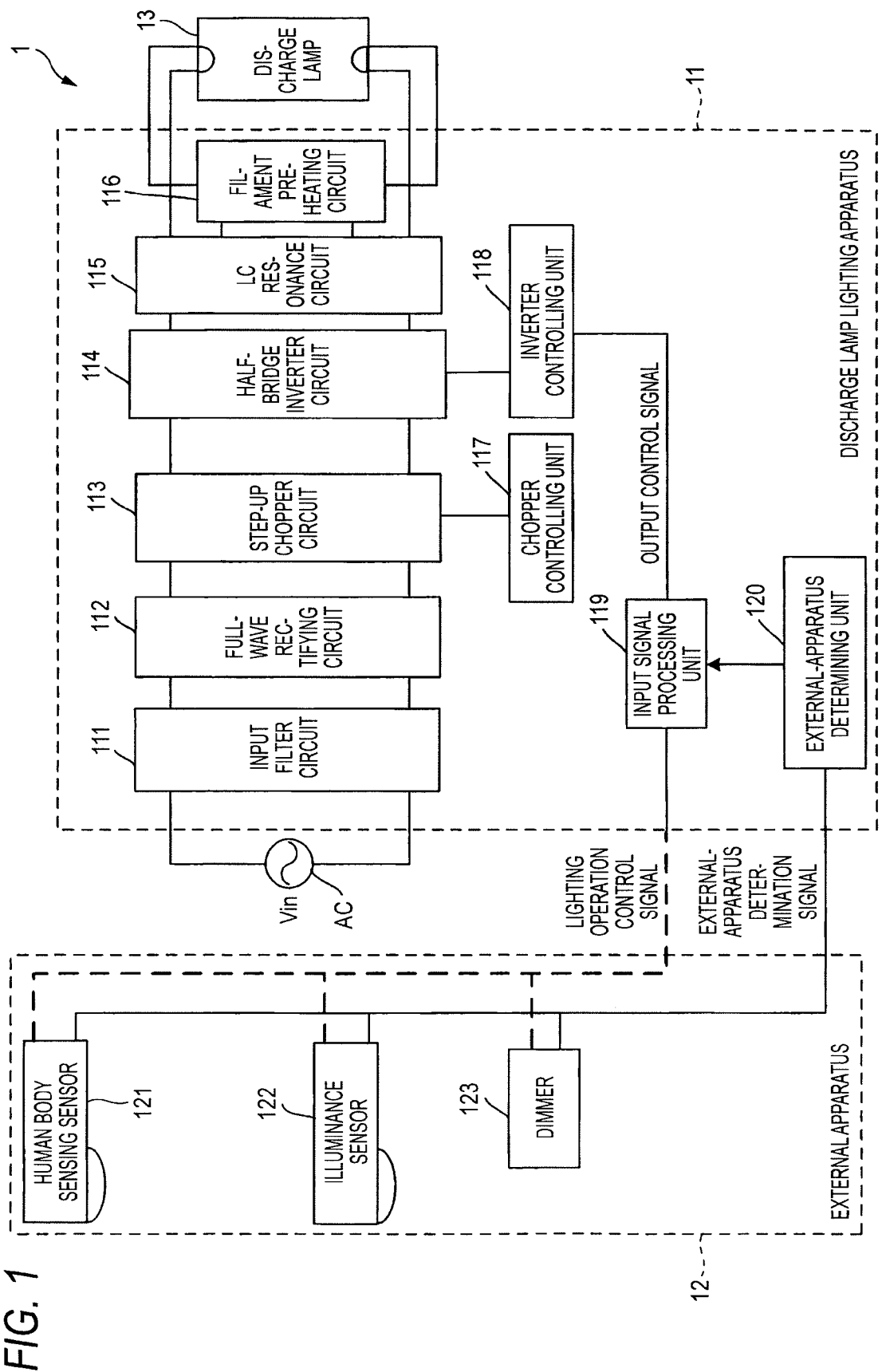
FIG. 1 is a diagram showing a schematic configuration of an illumination system of a first embodiment of the invention.

FIG. 1 is a diagram showing a schematic configuration of an illumination system of a first embodiment of the invention.

Referring to FIG. 1, the illumination system 1 of the embodiment has a configuration having an illumination lighting apparatus 11, an external apparatus 12 which is connected to the illumination lighting apparatus 11, and a discharge lamp 13 which is lit by being supplied with an electric power from the illumination lighting apparatus 11.

The illumination lighting apparatus 11 of the illumination system 1 of the embodiment is configured by adding an input signal processing unit 119 and an external-apparatus determining unit 120 to a usual electronic ballast which is configured by an input filter circuit 111, a full-wave rectifying circuit 112, a step-up chopper circuit 113, a half-bridge inverter circuit 114, an LC resonance circuit 115, a filament preheating circuit 116, a chopper controlling unit 117, and an inverter controlling unit 118.

The input filter circuit 111 is connected to a commercial power supply AC, and prevents high-frequency noises from being superimposed on a power supply line.

The full-wave rectifying circuit 112 full-wave rectifies the commercial power supply from which high-frequency noises are removed, and the step-up chopper circuit 113 chops the rectified DC voltage to step up the voltage to a constant high voltage (chopper voltage Vdc) which will be used as an inverter power supply.

The half-bridge inverter circuit 114 is a half-bridge type inverter circuit in which a series circuit consisting of switching elements is connected between the both ends of a smoothing capacitor, and the switching elements are alternately turned ON/OFF, whereby the chopper voltage Vdc is switched to be converted to a high-frequency rectangular voltage.

The LC resonance circuit 115 produces a substantially sinusoidal voltage by means of a resonance function due to input of the rectangular voltage from the half-bridge inverter circuit 114. The produced substantially sinusoidal voltage is applied between the both ends of the discharge lamp 13 to light ON the discharge lamp 13.

The filament preheating circuit 118 preheats filaments of the discharge lamp 13 to ensure the lighting-ON, and prevents the rated life of the discharge lamp 13 from being impaired.

The chopper controlling unit 117 controls the switching operations of the switching elements included in the step-up chopper circuit 113.

The inverter controlling unit 118 controls the switching frequency included in the half-bridge inverter circuit 114, and substantially determines the optical output of the discharge lamp 13. The switching frequency changes in accordance with an output control signal which is input from the input signal processing unit 119.

Namely, when the output control signal is increased, the switching frequency is lowered, and the frequency characteristics of the LC resonance circuit 115 and the impedance of the discharge lamp 13 cause the optical output of the discharge lamp 13 to be increased. When the output control signal is lowered, the switching frequency becomes high, and the optical output of the discharge lamp 13 is lowered.

The input signal processing unit 119 receives a lighting operation control signal which is sent from the external apparatus 12, changes the signal processing form based on the kind of the external apparatus 12 which is determined by the external-apparatus determining unit 120, and converts the signal to a DC output control signal corresponding to the kind of the external apparatus 12.

The external-apparatus determining unit 120 receives an external-apparatus determination signal which is sent from the external apparatus 12, determines the kind of the external apparatus 12, and sends a result of the determination to the input signal processing unit 119.

The external apparatus 12 includes a human body sensing sensor 121, an illuminance sensor 122, and a dimmer 123.

The human body sensing sensor 121 senses the presence/absence of a person based on infrared rays emitted from the human body, and outputs a lighting operation control signal having an H- or L-level to the input signal processing unit 119 of the illumination lighting apparatus 11.

The illuminance sensor 122 detects the ambient brightness due to daylight, and outputs a lighting operation control signal which has a DC voltage of 0 to 5 V according to the detected brightness, to the input signal processing unit 119 of the illumination lighting apparatus 11.

The dimmer 123 outputs a PWM signal having a constant frequency to the input signal processing unit 119 of the illumination lighting apparatus 11, in order to arbitrarily control the brightness of the illumination environment.

The human body sensing sensor 121, the illuminance sensor 122, and the dimmer 123 output external-apparatus determination signals which are unique respectively thereto, to the external-apparatus determining unit 120 of the illumination lighting apparatus 11.

As described above, the illumination system of the first embodiment of the invention includes the illumination lighting apparatus which is configured by adding the input signal processing unit and the external-apparatus determining unit to the usual electronic ballast, automatically determines the connected external apparatus, and performs the lighting control corresponding to the determined external apparatus, and hence the general versatility can be improved. Since it is not required to dispose a sensor control block, the configuration is simplified, and the cost can be suppressed.

Second Embodiment

Figure 2:
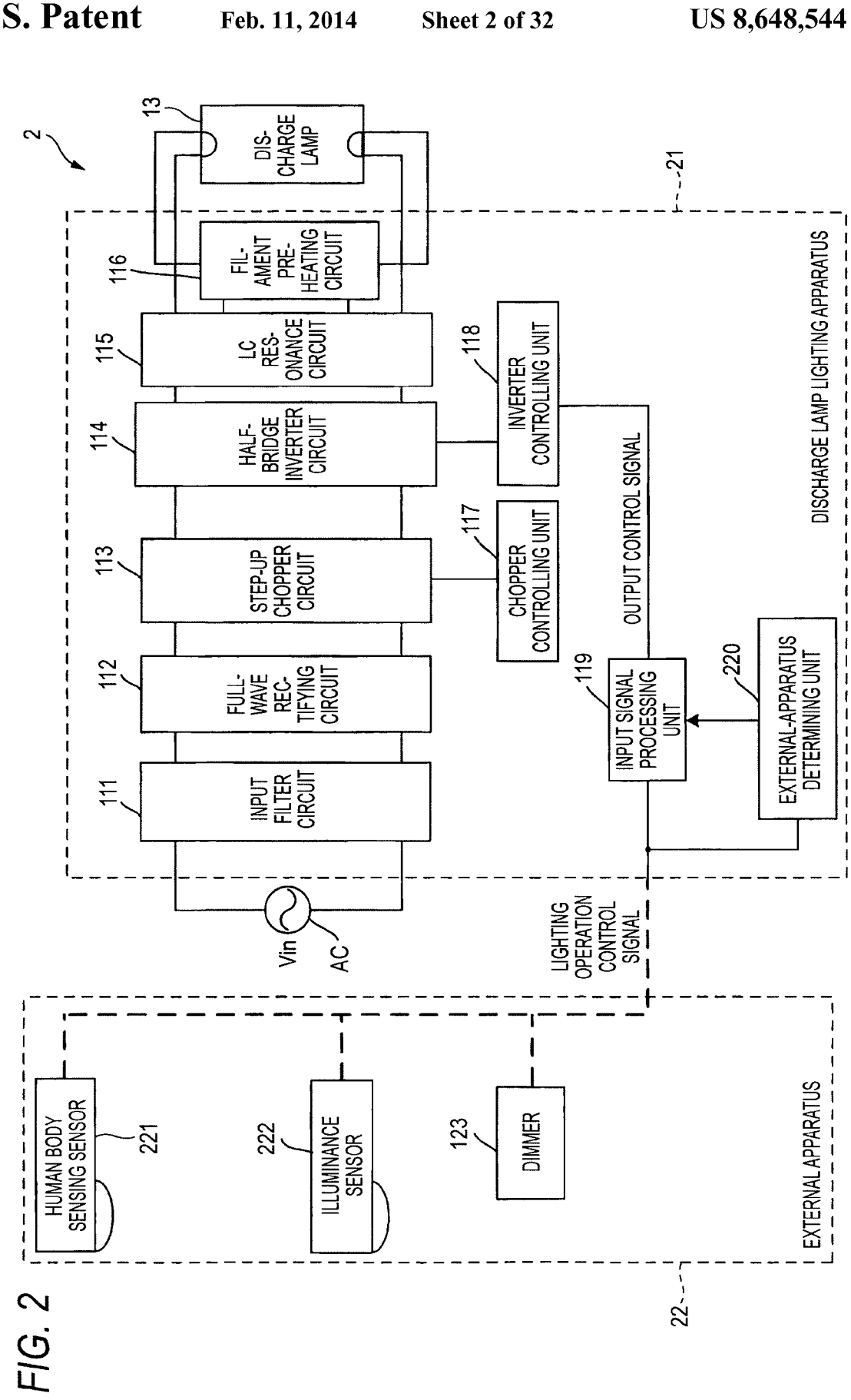
FIG. 2 is a diagram showing a schematic configuration of an illumination system of a second embodiment of the invention.

FIG. 2 is a diagram showing a schematic configuration of an illumination system of a second embodiment of the invention. The components which are identical with those of FIG. 1 in the first embodiment are denoted by same reference numerals, and their description is simplified or omitted.

In FIG. 2, the illumination system 2 of the embodiment has a configuration having an illumination lighting apparatus 21, an external apparatus 22 which is connected to the illumination lighting apparatus 21, and the discharge lamp 13 which is lit by being supplied with an electric power from the illumination lighting apparatus 11.

The illumination lighting apparatus 21 of the illumination system 1 of the embodiment has a configuration which has an external-apparatus determining unit 220 in place of the external-apparatus determining unit 120 of the illumination lighting apparatus 11 shown in the first embodiment.

The external apparatus 22 includes a human body sensing sensor 221, an illuminance sensor 222, and a dimmer 223. Each of them outputs a lighting operation control signal to the input signal processing unit 119 and the external-apparatus determining unit 220.

The external-apparatus determining unit 220 receives the external-apparatus determination signal which is sent from the external apparatus 22, determines the kind of the external apparatus 22, and sends a result of the determination to the input signal processing unit 119.

Figure 3:
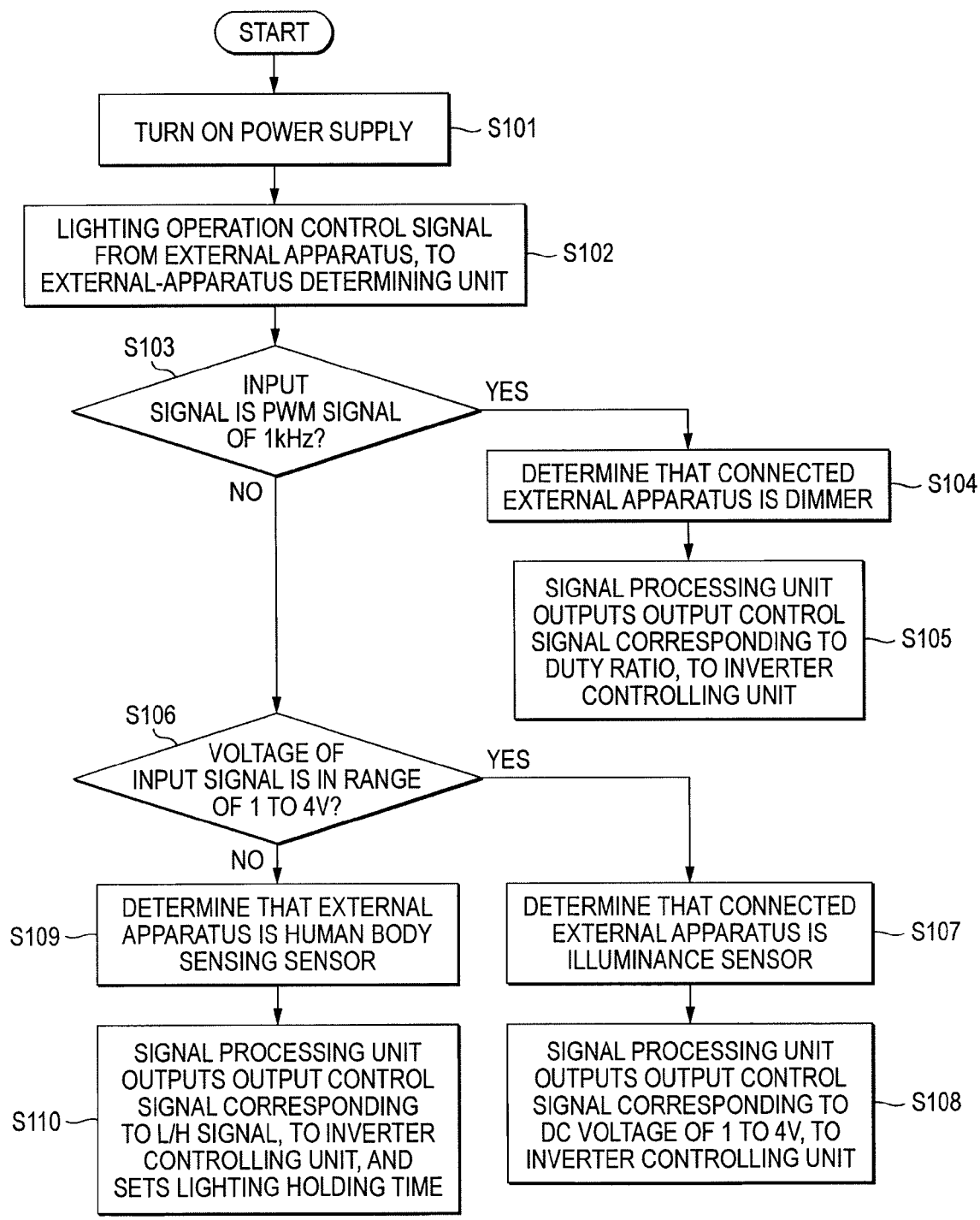
FIG. 3 is a flowchart illustrating a method of, in the illumination system of the second embodiment of the invention, determining the kind of a connected external apparatus.

Here, the method of determining the kind of the external apparatus 22 in the external-apparatus determining unit 220, and that of processing a signal in accordance with the external apparatus 22 in the input signal processing unit 119 will be described. FIG. 3 is a flowchart illustrating the method of determining the kind of the connected external apparatus 22 in the external-apparatus determining unit 220.

In step S101, when the power supply of the illumination system 2 is turned ON, first, the lighting operation control signal is input from the connected external apparatus 22 to the external-apparatus determining unit 220 of the illumination lighting apparatus 21 (step S102).

The external-apparatus determining unit 220 checks whether the input signal is a PWM signal having a frequency of 1 kHz or not (step S103), and, if the input signal is a PWM signal having a frequency of 1 kHz, determines that the connected external apparatus is the dimmer 223 (step S104).

Next, the input signal processing unit 119 performs a signal process corresponding to the dimmer 223, on the input lighting operation control signal, and outputs an output control signal corresponding to the duty ratio of the PWM signal, to the inverter controlling unit 118 (step S105).

Figure 4:
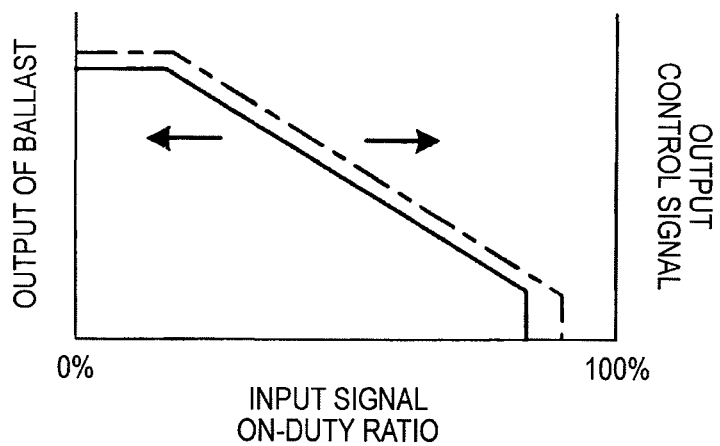
FIG. 4 is a view illustrating manners of an output control signal and outputs of an electronic ballast in the case where the connected external apparatus is a dimmer, in the illumination system of the second embodiment of the invention.

FIG. 4 is a view showing a manner in which the level of the output control signal is changed in accordance with the ON duty ratio of the PWM signal of the input lighting operation control signal, and the output level of the electronic ballast supplied to the discharge lamp 13 is changed. As shown in the figure, as the ON duty ratio of the PWM signal is more increased, the level of the output control signal and the output level of the electronic ballast are more reduced.

Returning to the flowchart, if, as a result of the check in step S103, the signal which is input to the external-apparatus determining unit 220 is not a PWM signal having a frequency of 1 kHz, it is checked in step S106 whether the input signal is a DC voltage in the range of 1 to 4 V or not.

If, as a result of the check, the input signal is a DC voltage in the range of 1 to 4 V, it is determined that the connected external apparatus is the illuminance sensor 222 (step S107).

The input signal processing unit 119 performs a signal process corresponding to the illuminance sensor 222, on the input lighting operation control signal, and outputs an output control signal corresponding to the DC voltage level in the range of 1 to 4 V, to the inverter controlling unit 118 (step S108).

Figure 5:
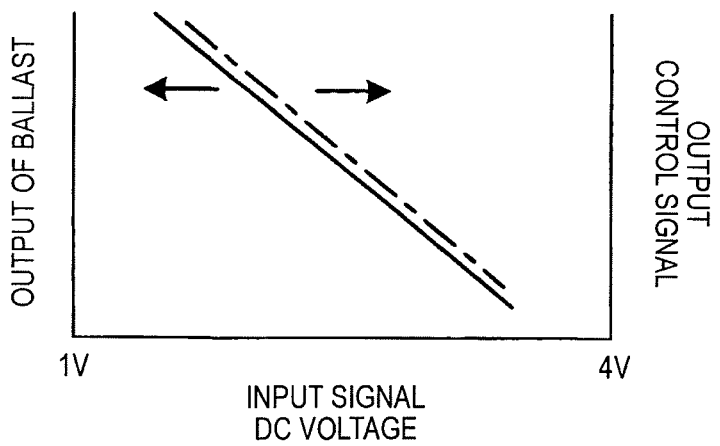
FIG. 5 is a view illustrating manners of the output control signal and outputs of the electronic ballast in the case where the connected external apparatus is an illuminance sensor, in the illumination system of the second embodiment of the invention.

FIG. 5 is a view showing a manner in which the level of the output control signal is changed in accordance with the DC voltage level of the input lighting operation control signal, and the output level of the electronic ballast supplied to the discharge lamp 13 is changed. As shown in the figure, as the DC voltage level becomes higher, the level of the output control signal and the output level of the electronic ballast are further lowered.

Returning to the flowchart, if, as a result of the check in step S106, the signal which is input to the external-apparatus determining unit 220 is not a DC voltage in the range of 1 to 4 V, it is determined in step S109 that the connected external apparatus is the human body sensing sensor 221 (step S109).

The input signal processing unit 119 performs a signal process corresponding to the human body sensing sensor 221, on the input lighting operation control signal, and, if the signal is a Low signal of 0 V, outputs the output control signal of lighting OFF the discharge lamp 13 to the inverter controlling unit 118, and, if the signal is a High signal of 5 V or higher, outputs the output control signal of lighting ON the discharge lamp 13 to the inverter controlling unit. Furthermore, the unit sets the lighting holding time which is used after the presence of a person is sensed, the lamp is lit ON, and the absence of a person is sensed, and outputs the time to the inverter controlling unit 118 (step S110).

Figure 6:
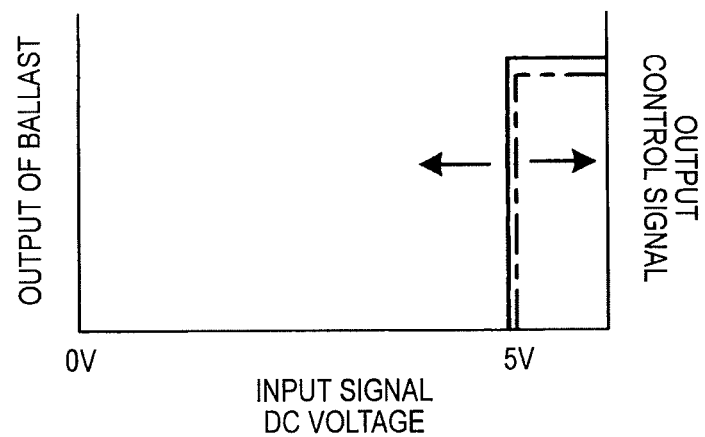
FIG. 6(A) is a view illustrating manners of the output control signal and outputs of the electronic ballast in the case where the connected external apparatus is a human body sensing sensor, in the illumination system of the second embodiment of the invention.
FIG. 6(B) is a view illustrating setting of a lighting holding time in the case where the connected external apparatus is a human body sensing sensor, in the illumination system of the second embodiment of the invention.
Figure 6:
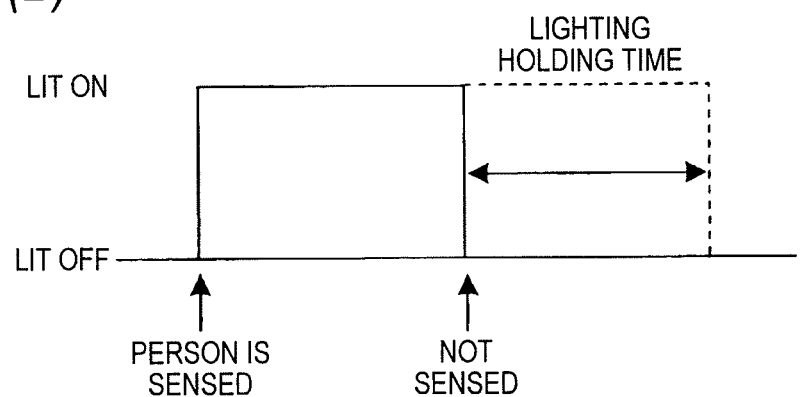

FIG. 6(A) is a view showing a manner in which the discharge lamp 13 is lit OFF or on in accordance with the Low signal and High signal of the input lighting operation control signal. As shown in the figure, if the signal is the Low signal of 0 V, the level of the output control signal and the output level of the electronic ballast are set to 0 to light OFF the discharge lamp 13, and, if the signal is the High signal of 5 V or higher, the output control signal and the electronic ballast are set to full output to light on the discharge lamp 13.

FIG. 6(B) shows a manner in which, when a person is sensed, the discharge lamp 13 is lit ON, and, when a person is not sensed, the lighting holding time is set in the input signal processing unit 119 and the lighting is continued.

As described above, according to the illumination system of the second embodiment of the invention, the kind of the connected external apparatus is automatically determined based only on the lighting operation control signal which is output from the external apparatus. Therefore, an adequate lighting control corresponding to the external apparatus can be performed, and the general versatility can be improved. Moreover, it is not required to dispose a sensor control block. Therefore, the configuration is simplified, and the cost can be suppressed.

In the following embodiments, configuration examples of a lighting apparatus in the case where a discharge lamp is used as a lamp of the light source will be shown.

Figure 7:
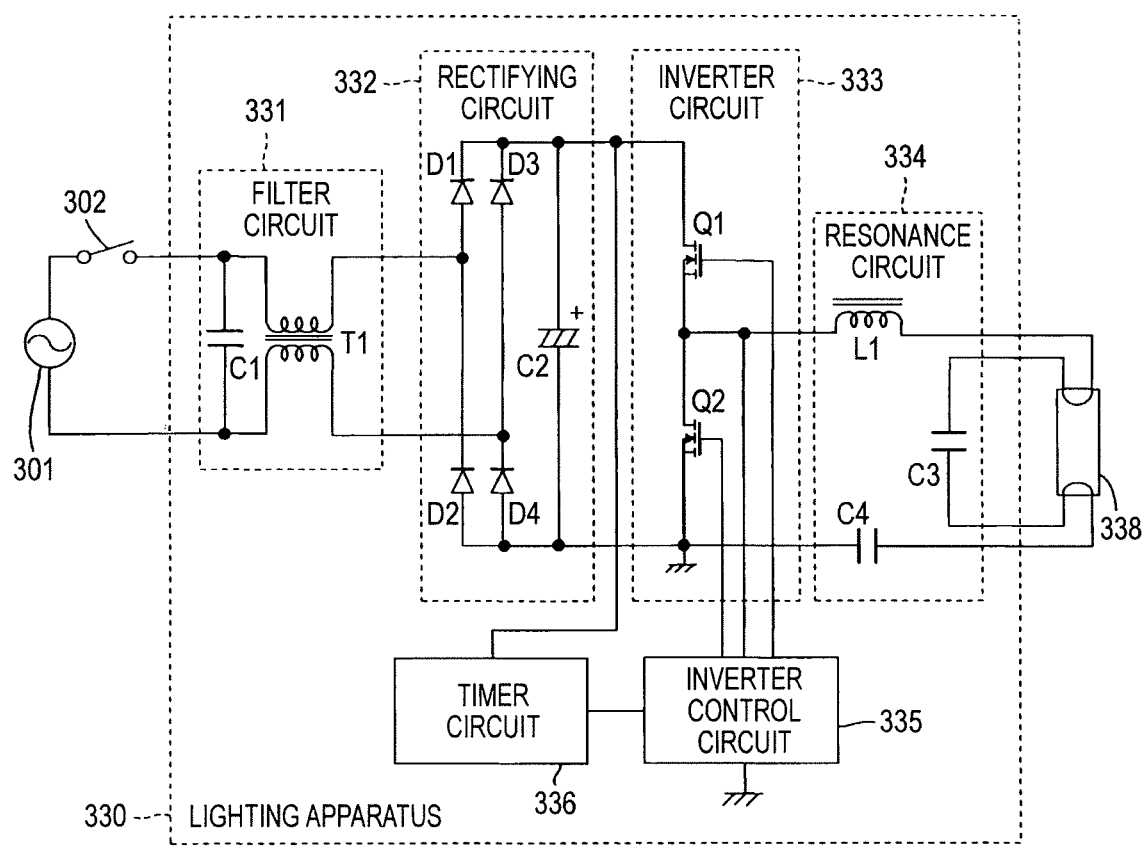
FIG. 7 is a diagram showing a schematic configuration of an example of a conventional discharge lamp lighting apparatus.

Conventionally, a lighting apparatus in which the luminous efficiency is improved by causing a discharge lamp to be lit ON by a high frequency and energy saving can be performed has been proposed. FIG. 7 shows an example of a conventional lighting apparatus. A commercial power supply 301 is connected to the input of the lighting apparatus 330 through a switch 302, and a lamp 338 which is a hot cathode fluorescent lamp is connected to the output. The lighting apparatus 330 is configured by a filter circuit 331, a rectifying circuit 332, an inverter circuit 333, and a resonance circuit 334 in the sequence beginning from the input side, and connected to the lamp 338 which functions as a load.

In the lighting apparatus 330, first, the rectifying circuit 332 is configured by diodes D1 to D4 which are configured as a bridge, and a capacitor C2 having a relatively a large capacity, such as an aluminum electrolytic capacitor, and full-wave rectifies the AC voltage of the commercial power supply 301 to smooth into a substantially constant DC voltage. The inverter circuit 333 is connected to the output stage of the rectifying circuit 332, and has a configuration where two switching elements such as MOSFETs are connected in series. The two switching elements Q1, Q2 are alternately switched at a high frequency of about 50 kHz, whereby a high-frequency rectangular voltage is generated between both ends of the switching element. Therefore, the DC voltage which is smoothed by the rectifying circuit 332 can be converted to a high-frequency voltage.

In the resonance circuit 334, a choke coil L1, a resonance capacitor C3, and a DC-cut capacitor C4 are connected in series in parallel to the switching element Q2 of the inverter circuit 333, converts the rectangular voltage of the inverter circuit 333 to a sinusoidal voltage, and then supplies the voltage to the lamp 338. The resonance capacitor C3 is connected to the choke coil L1 and the DC-cut capacitor C4 through the respective electrodes of the lamp 338. When the lamp 338 is to be lit ON, a current flowing through the resonance circuit 334 is used also as a preheating current by which the electrodes of the lamp 338 are heated. In a state before the lamp 338 starts to discharge, the equivalent impedance of the lamp 338 is very larger than that in lighting. Therefore, it is possible to easily obtain a high voltage which is required to cause the lamp 338 to start to discharge, between the both ends of the resonance capacitor C4.

An inverter control circuit 335 changes the operation frequency of the inverter circuit 333, and controls the power to be supplied to the lamp 338 by using a phenomenon that the impedance of the resonance circuit 334 is changed depending on the frequency. A timer circuit 336 which measures the time from the start of the operation of the inverter circuit 333 is connected to the inverter control circuit 335. A preheating time tp when the electrodes of the lamp 338 are heated, and a timing when a high voltage Vs is applied between the electrodes of the lamp 338 are controlled based on the measurement time of the timer circuit 336, thereby enabling the lamp 338 to be surely lit. An IC in which the functions of the inverter control circuit 335 and the timer circuit 336 are integrated is commercially available. When, for example, an IC such as IR2156 manufactured by International Rectifier (IR) Corporation is used, the circuits can be easily configured.

The inverter circuit 333 has the switching elements Q1, Q2, and performs a switching operation at a high frequency. Therefore, the circuit generates switching noises. High-frequency noises are cut by the filter circuit 331 so that the noises and the like do not cause a failure in other electronic apparatus, etc., through the power supply line. When such a lighting apparatus is used, the luminous efficiency of the discharge lamp can be improved, and energy to be consumed by the illumination apparatus can be drastically saved.

Recently, in order to further save energy, illumination apparatuses in which, for example, a human sensor is used, and, when a person is absent, a discharge lamp can be lit OFF are increasing. In such a discharge lamp illumination apparatus, however, the preheating time tp when the electrodes are heated is set to 1.0 to 1.5 seconds. Therefore, a time delay of about 1.5 seconds is produced between the timing when the sensor senses a person, and that when the lamp is lit ON, and the user may feel a sense of discomfort.

In the case where such an illumination apparatus is disposed in a place where people come and go, such as a corridor, particularly, it may be possible that the lamp is lit after a person has passed over. In an illumination apparatus of this kind, therefore, it is preferred that the time delay is made as short as possible. Preferably, the preheating time tp is 0.5 seconds or less.

In the lighting apparatus of the conventional example shown in FIG. 7, when a high voltage is applied to the lamp 338 to supply a preheating current If in order to heat the electrodes before the start of discharge, however, the preheating current If is supplied to the both electrodes through the capacitor C3. Therefore, the preheating current and the impedance of the capacitor C3 cause a voltage Vp to be generated between the both ends of the capacitor, and the voltage is directly applied between the electrodes of the lamp 338. The voltage Vp is given by a preheating current Ifp, the capacitor capacitance C3, and the operation frequency fp of the inverter circuit as the following expression.

$$Vp = \frac{Ifp}{2\pi fp C3} \quad [\text{Exp. 1}]$$

Namely, as the preheating current Ifp is larger, the voltage Vp generated in the capacitor C3 is higher. Depending on conditions, the voltage Vp may cause the lamp 338 to start discharge. When such a high voltage is applied to the lamp 338 during the preheating time tp, the lamp 338 discharges before the electrodes are sufficiently heated. When discharge is started in such conditions, the electrodes are largely damaged. In the case where lighting ON and OFF of the lamp 338 are repeated, moreover, the emitters of the electrodes are consumed, and the life of the lamp 338 is shortened.

This will be described in further detail with reference to the example of the discharge lamp lighting apparatus of FIG. 7. In the case where FHF32 (straight tube-type high-frequency lighting 32 W) is lit with the preheating time tp=0.5 seconds, for example, the electrical characteristics of a FHF32 lamp in rated lighting, and the design reference of a high-frequency lighting ballast are listed in Table 1 (electrical characteristics of FHF32) and Table 2 (design reference of high-frequency lighting ballast for FHF32) according to the data sheet shown in JIS C7617-2 (abstract).

TABLE 1

Electrical Characteristics

| | Lighting Conditions | | | |
|---|---|---|---|---|
| | Frequency | Lamp Power | Lamp Voltage | Lamp Current |
| Rated Lighting | 45 ± 0.9 kHz | 45.3 W | 107 ± 10 V | 0.425 A |

TABLE 2

Preheating Conditions under Current Control

| | | |
|---|---|---|
| Minimum Preheating Current ik (A) corresponding to Preheating Time tp (s) ik = (a/tp + im$^2$)$^{0.5}$ | a (A$^2$s) im (A) | 0.200 0.250 |
| Maximum Preheating Current ik (A) corresponding to Preheating Time tp (s) ik = (A/tp + IM$^2$)$^{0.5}$ | A (A$^2$s) IM (A) | 0.960 0.400 |
| Pseudo Resistance (Ω) of Cathodes | | 6.0 |

Applied Voltage

| | | | | |
|---|---|---|---|---|
| Open Voltage (V) between Ends of Lamp | One-Side Grounded | t ≤ tp tp < t | Maximum Value Minimum value | 280 240 |
| | Middle-point Grounded | t ≤ tp tp < t | Maximum Value Minimum value | 360 430 |

From the data sheet, in the case where the preheating time tp is 0.5 seconds, the optimum range of the preheating current If is 0.68 A or more and 1.442 A or less. By contrast, a design example in the case where the preheating current is to be ensured in the circuit configuration of FIG. 7 will be shown below.

| | | |
|---|---|---|
| Resonance circuit | Choke coil L1: 1.25 mH | |
| | Capacitor C3: 4.7 nF | |
| Chopper circuit | Output voltage: 400 V | |
| Inverter circuit | Operation frequency | preheating: 77 kHz |
| | | lighting: 53 kHz |

Under the above conditions, the electrical characteristics which are supplied from the lighting apparatus 330 to the lamp 338 are as follows. The voltage which is applied to the lamp during preheating is equal to or higher than the voltage required for starting of the lamp. Therefore, the lamp is lit before the electrodes are sufficiently heated, and the electrodes are largely damaged.

Preheating current Ifp: 1.09 A
Applied voltage Vp in preheating: 480 V
Lamp current in lighting: 0.425 A As described above, in order to light the lamp while the preheating time tp is shortened and the electrodes of the lamp are not damaged, it is necessary that a sufficient preheating current is flown through the electrodes while suppressing the voltage applied to the lamp. In the lighting apparatus of the conventional example shown in FIG. 7, however, there are many design constraint conditions, and it is difficult to realize the above.

Figure 8:
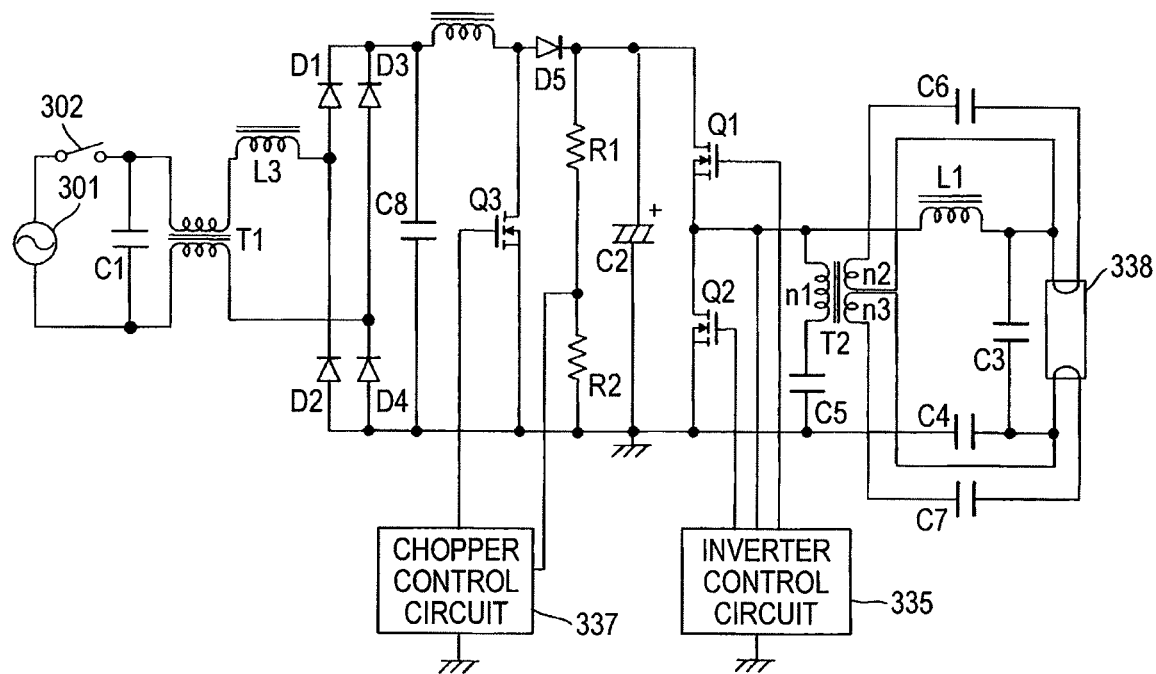
FIG. 8 is a diagram showing a schematic configuration of another example of a conventional discharge lamp lighting apparatus.

The object that a sufficient preheating current is flown through the electrodes while shortening the preheating time and suppressing the voltage applied to the lamp can be achieved by, as shown in FIG. 8, using a preheating transformer T2, and disposing a preheating circuit separately from a resonance circuit. In the circuit shown in FIG. 8, however, there is a problem in that, when a preheating current is increased, the preheating current is large also during lighting, and an unwanted power in the electrodes is increased.

Figure 9:
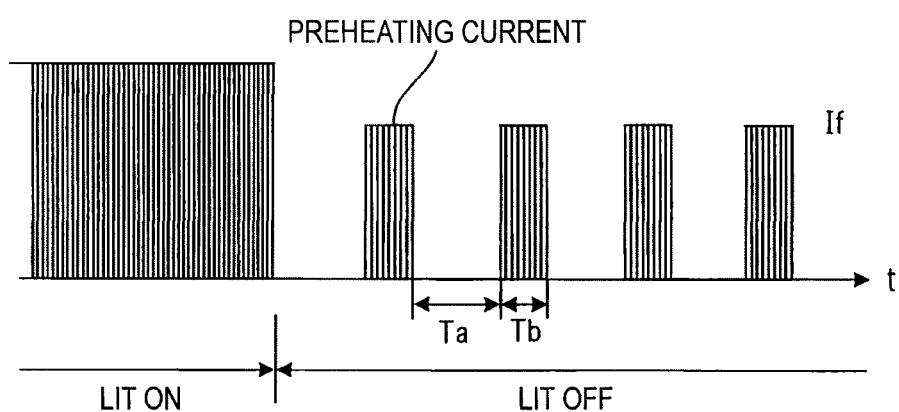
FIG. 9 is a time chart illustrating the operation of a conventional discharge lamp lighting apparatus.

As a countermeasure against such a problem, JP-A-2001-93694 (Patent Document 3) proposes a discharge lamp lighting apparatus in which a preheating current is supplied even after lighting-OFF due to a sensor, and instantaneous lighting is enabled. The discharge lamp lighting apparatus of Patent Document 3 includes: a DC power supply; an inverter circuit which converts the output of the DC power supply to a high-frequency power; a resonance circuit which is connected to the output of the inverter circuit; a discharge lamp which is driven by the resonance function of the resonance circuit; an inverter control circuit which makes the output of the inverter circuit variable, and a dimming control circuit which receives a dimming signal from the outside, and which performs a dimming control and a lighting ON/OFF control on the discharge lamp. When the discharge lamp is to be lit OFF, as shown in FIG. 9, preheating current of at least of two levels are switchingly supplied to the electrodes of the discharge lamp at predetermined intervals.

In this case, a method is employed in which a first period Tb when the level of the preheating current If is set high, and a second period Ta when the level of the preheating current is set low are alternately switched over, the first period Tb is set to be sufficiently shorter than the second period Ta, whereby a preheating current of a level at which the discharge lamp is not lit continues to be supplied to the electrodes. According to the method, instantaneous lighting is enabled.

In the conventional example disclosed in Patent Document 3 above, although instantaneous lighting is enabled, however, the current is constantly flown to the electrodes in the waiting and preheating state, and power is consumed in the electrodes. When the waiting and preheating state is prolonged, therefore, there arises a problem in that the power consumption is increased.

In view of the above-discussed problem, a configuration example of a discharge lamp lighting apparatus in which a larger preheating current can be supplied in a short preheating time, and that of a discharge lamp lighting apparatus in which the power consumption can be reduced during lighting of the lamp and the waiting and preheating time, whereby energy saving can be performed will be exemplarily described in the following embodiments.

Third Embodiment

Figure 10:
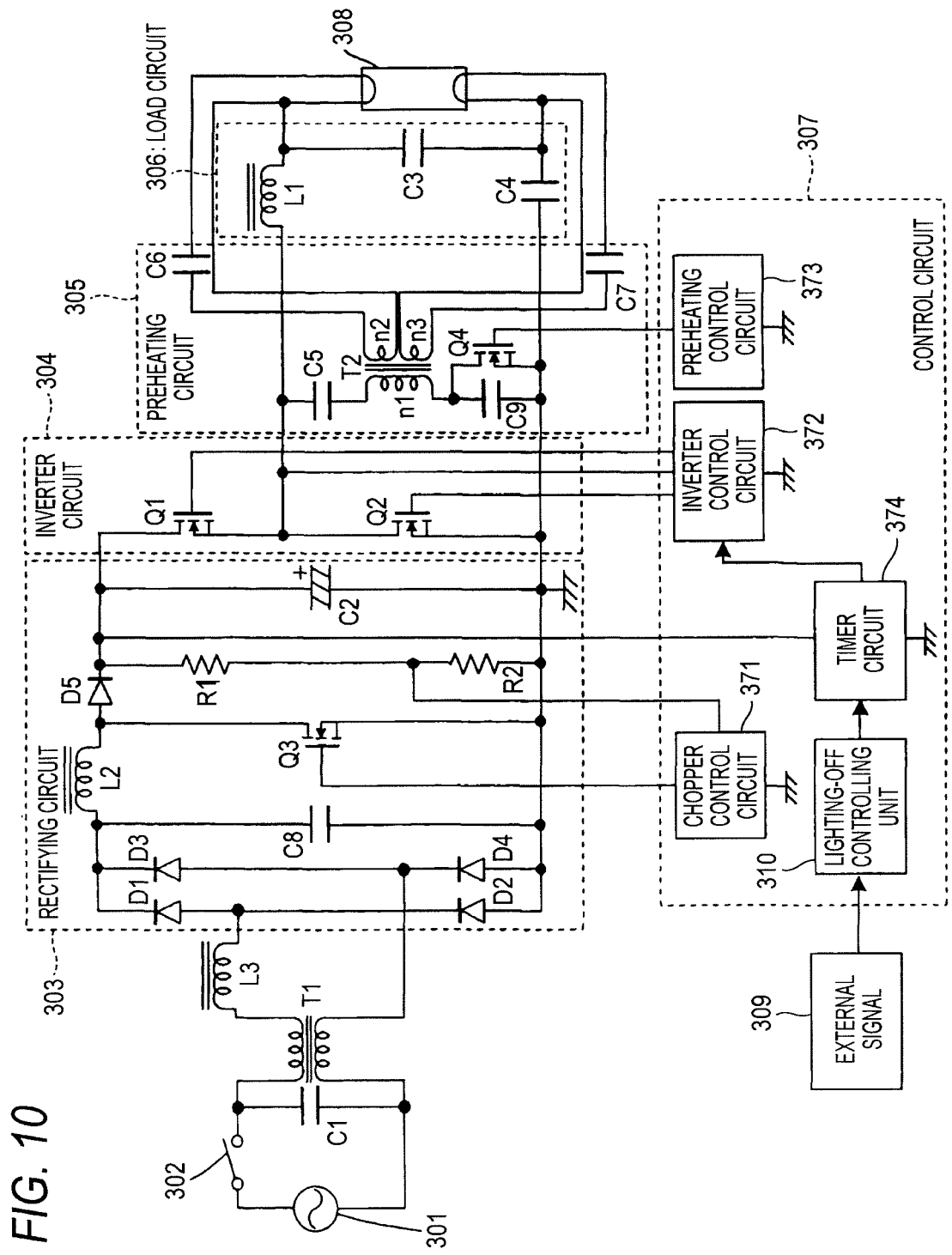
FIG. 10 is a diagram showing a schematic configuration of a discharge lamp lighting apparatus of a third embodiment of the invention.
Figure 11:
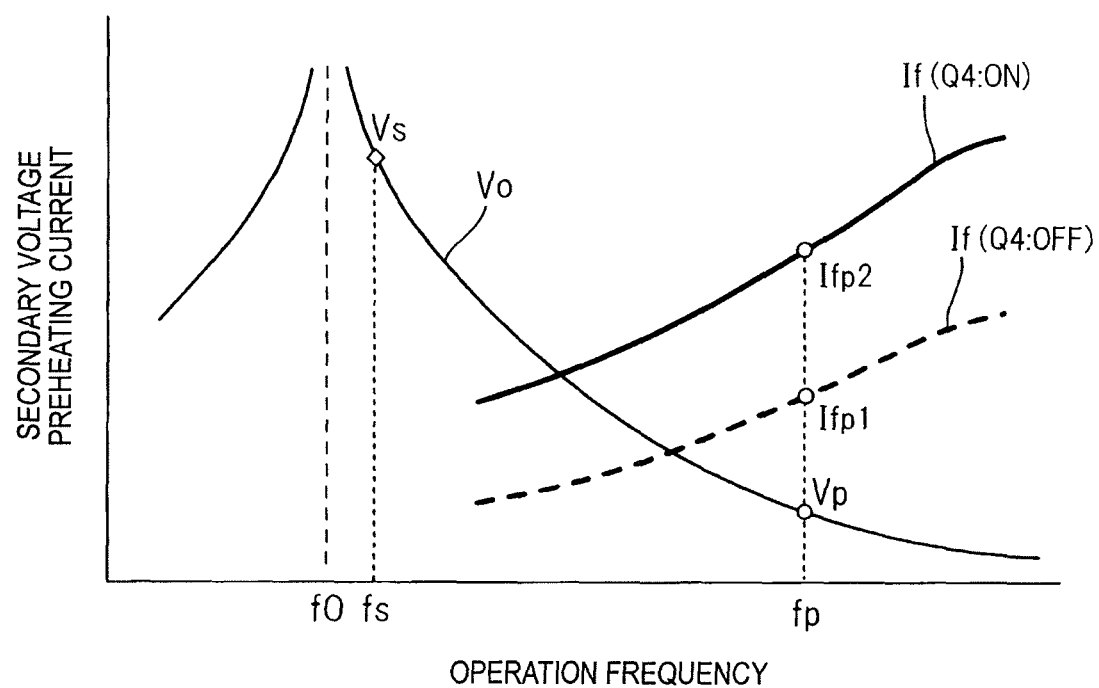
FIG. 11 is a characteristic view showing frequency characteristics of an output voltage V0 and a preheating current If in the discharge lamp lighting apparatus of the third embodiment.

The specific configuration of a third embodiment of the invention will be described in detail with reference to the diagram shown in FIG. 10 and the characteristic view shown FIG. 11. FIG. 10 is a diagram showing a schematic configuration of a discharge lamp lighting apparatus of the third embodiment of the invention. FIG. 11 is a characteristic view showing frequency characteristics of an output voltage V0 of a load circuit 306 in the discharge lamp lighting apparatus of the third embodiment, and the preheating current If due to a preheating circuit 305.

The commercial power supply 301 is connected to the input of the discharge lamp lighting apparatus shown in FIG. 10 through the switch 302, and a lamp 308 which is a hot cathode fluorescent lamp is connected to the output. The discharge lamp lighting apparatus is configured by a rectifying circuit 303, an inverter circuit 304, the preheating circuit 305, and the load circuit 306 in the sequence beginning from the input side, and connected to the lamp 308 which functions as a load.

In the discharge lamp lighting apparatus, first, the rectifying circuit 303 is configured by: the diodes D1 to D4 which are configured as a bridge for full-wave rectifying the AC power supply AC that is input from the commercial power supply 301; a chopper circuit which is connected to the DC power supply, which has at least one switching element Q3, and which converts the DC voltage from the DC power supply to a predetermined DC voltage; and a capacitor C2 having a relatively a large capacity, such as an aluminum electrolytic capacitor. The rectifying circuit 303 full-wave rectifies the AC voltage from the commercial power supply 301 to smooth into a substantially constant DC voltage. The input-side AC power supply AC is a commercial AC power supply, and the voltage is, for example, 100 V, 200 V, or 240 V.

Hereinafter, configurations of components of the rectifying circuit 303 will be described in detail. The diodes D1 to D4 rectify the AC voltage from the AC power supply AC to a pulsating voltage, and output the pulsating voltage. The chopper circuit is a step-up AC-DC converter, steps up the power supply voltage which is full-wave rectified by the rectifying circuit 303, to a predetermined DC voltage, and outputs the DC voltage. The chopper circuit is configured so that a choke coil L2 and a diode D5 are connected in series between one end of the output stage of the diode bridge D1 to D4 of the rectifying circuit 303, and the smoothing capacitor C2, and the switching element Q3 such as a MOSFET is connected between the connection point of the choke coil L2 and the diode D5 and the other one end of the output stage of the diode bridge D1 to D4.

When the switching element Q3 is made conductive, a current flows from the output stage of the diode bridge D1 to D4 through the choke coil L2 and the switching element Q3, whereby energy is stored in the choke coil L2. Next, when the switching element Q3 is interrupted, the energy stored in the choke coil L2 is supplied to the capacitor C2 through the diode D5. In this way, the conduction and interruption of the switching element Q3 are repeated. As a result, the current supply to the capacitor C2 and its interruption are repeated, and the switching is performed at high frequency, whereby a substantially DC voltage can be obtained at the both ends of the capacitor C2.

A choke coil L3 is connected between a filter T1 and the diode bridge D1 to D4, and a capacitor C8 is connected in parallel to the output stage of the diode bridge D1 to D4. The choke coil L3 and the capacitor C8 constitute a filter circuit, and cause a high-frequency current which is generated by switching of the chopper circuit, to be bypassed through the capacitor C8, thereby preventing the high-frequency current from entering toward the commercial power supply 301.

Although the step-up chopper circuit has been described, a chopper circuit of another kind, such as a step-down or step-up/down chopper circuit may be used. As far as the configuration can convert the AC voltage of the commercial power supply 301 to a DC voltage, the function and the effect are same.

Next, the inverter circuit 304 will be described in detail. The inverter circuit 304 is connected to the output stage of the rectifying circuit 303, and has a configuration where two switching elements such as MOSFETs are connected in series. The two switching elements Q1, Q2 are alternately switched at a high frequency of about 50 kHz, whereby a high-frequency rectangular voltage is generated between both ends of the switching element. Therefore, the DC voltage which is smoothed by the rectifying circuit 303 can be converted to a high-frequency voltage.

In the embodiment, a so-called half-bridge type inverter circuit is employed as the inverter circuit. It is a matter of course that the inverter circuit may be of another type such as the full-bridge type, the one-transistor type, or the push-pull type.

Next, the preheating circuit 305 will be described in detail. The preheating circuit 305 has the transformer T2. One end of the primary winding n1 of the transformer T2 is connected to the output stage of the inverter circuit 304 through the DC-cut capacitor C5. Windings n2, n3 are disposed in the secondary side of the transformer T2 so that the two electrodes can be independently heated, and connected to the electrodes through capacitors C6, C7, respectively. Furthermore, a capacitor C9 and a switching element Q4 such as a MOSFET are disposed to be connected in parallel between the other end of the primary winding n1 of the transformer T2 and the output stage of the inverter circuit 304. A control for supplying the predetermined preheating current is performed by the ON/OF operations of the switching element Q4.

When the switching element Q4 is turned ON, the electrodes of the lamp are preheated while using the voltage generated in the secondary by the transformer T2, as a power supply. The capacitors C6, C7 function as current-reducing impedances for the preheating currents If of filaments, respectively. When the switching element Q4 is turned OFF, the capacitor C9 holds most of the rectangular voltage, and hence a voltage is not substantially generated in the secondary of the transformer T2. Therefore, it is possible to suppress the currents for preheating the electrodes of the lamp.

When the preheating circuit 305 is configured as described above, (the current supply amount when the switching element Q4 is turned ON)>(the current supply amount when the switching element Q4 is turned OFF) is attained, and the supply amount of the preheating current can be controlled by the switching element Q4. Hereinafter, the current when the switching element Q4 is turned OFF is referred to as the first preheating current Ifp1, and the current when the switching element Q4 is turned ON is referred to as the second preheating current Ifp2.

The load circuit 306 is configured by connecting a series circuit of the choke coil L1, the resonance capacitor C3, and the DC-cut capacitor C4 in parallel to the switching element Q2 of the inverter circuit 304. The load circuit 306 converts the rectangular voltage of the inverter circuit 304 to a sinusoidal voltage, and then supplies the sinusoidal voltage to the lamp 308.

Hereinafter, a control circuit 307 which is the main portion of the embodiment will be described in detail. The control circuit 307 is configured by a chopper control circuit 371, an inverter control circuit (inverter controlling unit) 372, a preheating control circuit (preheating controlling unit) 373, a timer circuit (timer unit) 374, and a lighting-OFF controlling unit 310.

The chopper control circuit 371 controls the switching operation of the switching element Q3, and detects the voltage between the both ends of the capacitor C2 while dividing the voltage by resistors R1 and R2. In the case where the voltage between the both ends of the capacitor C2 is lower than a predetermined voltage, a feedback control is performed so that the conduction time of the switching element Q2 is prolonged, and, in the case where the voltage between the both ends of the capacitor C2 is lower, a feedback control is performed so that the conduction time is shortened. Even when the power supply voltage or the state of the load is changed, therefore, the voltage of the capacitor C2 can be controlled to be constant.

The inverter control circuit 372 changes the operation frequency of the inverter circuit 304, and controls the power to be supplied to the lamp 308 by using a phenomenon that the impedance of the load circuit 306 is changed depending on the frequency. The timer circuit 374 which measures the time from the start of the operation of the inverter circuit 304 is connected to the inverter control circuit 372. The preheating time when the electrodes of the lamp 308 are heated, and a timing when a high voltage Vs is applied between the electrodes of the lamp 308 are controlled based on the measurement time of the timer circuit 374, thereby enabling the lamp 308 to be surely lit.

The preheating control circuit 373 controls the ON/OFF operations of the switching element Q4 of the preheating circuit 305. The preheating time when the electrodes of the lamp 308 are heated is measured by the timer circuit 374. Based on the measured time, the ON/OFF timing of the switching element Q4 of the preheating circuit 305 is controlled, whereby the preheating current can be freely switched in the two steps of the first preheating current and the second preheating current, and the supply of the currents flowing through the electrodes can be controlled.

The lighting-OFF controlling circuit 310 outputs a lighting-OFF signal and a lighting-ON signal, and transmits the signal to the timer circuit 374. In the case where a person is absent, the lighting-OFF controlling circuit 310 transmits the lighting-OFF signal to an external signal 309 such as a sensor, and, in the case where a person is sensed, transmits the lighting-ON signal to the timer circuit 374.

Figure 12:
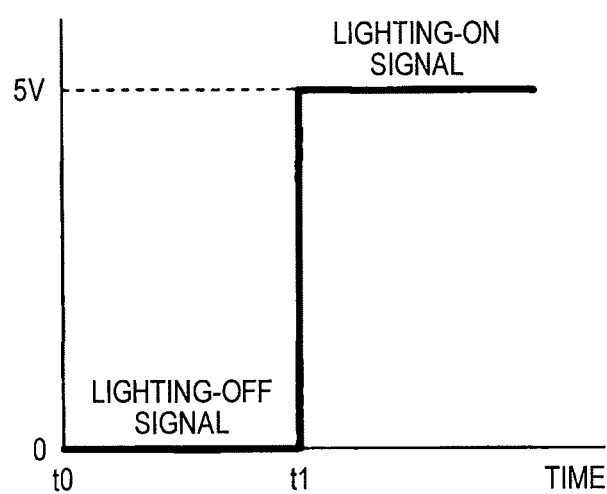
FIG. 12 is an operation illustrative view showing a lighting-OFF signal and a lighting-ON signal in the discharge lamp lighting apparatus of the third embodiment.

FIG. 12 is an operation illustrative view showing the lighting-OFF signal and the lighting-ON signal in the discharge lamp lighting apparatus of the third embodiment. As shown in FIG. 12, for example, the lighting-OFF controlling circuit 310 performs a control in which 0 V is transmitted as the lighting-OFF signal during the time interval t0-t1, and 5 V is transmitted as the lighting-OFF signal after time t1. Here, the lighting-OFF controlling circuit 310 performs, for example, the control in which, when a person is absent, the lamp is lit OFF, by using the output of a sensor which detects a person as the external signal 309. Alternatively, the unit may perform a duty control on a PWM signal, or control a DC voltage or a digital signal.

In the discharge lamp lighting apparatus of the embodiment, as a result of the above-described circuit configuration, the output voltage V0 and the preheating current If during the preheating time (the state where the lamp 308 is not lit) have the frequency characteristics such as shown in FIG. 11. In the figure, the frequency f0 is the natural resonance frequency of the load circuit 306. In the case of the circuit configuration of FIG. 10, the natural resonance frequency can be expressed by the following expression.

$$f0 = \frac{1}{2\pi\sqrt{L1C3}} \quad \text{[Exp. 2]}$$

The inverter control circuit 372 changes the operation frequency of the inverter circuit 304 to cause the operation frequency of the inverter circuit 304 to approach f0, whereby the output voltage V0 of the load circuit 306 can be made higher, or to separate from f0, whereby the output voltage V0 can be made lower.

In the embodiment, the switching element Q4 of the preheating circuit 305 is turned ON/OFF, so that, when the switching element Q4 is turned ON, the second preheating current Ifp2 is supplied, and, when the switching element Q4 is turned OFF, the preheating current is held by the capacitor C9 which is connected in parallel to the switching element Q4, and the first preheating current Ifp1 which is smaller than the second preheating current Ifp2 is supplied.

Here, in the relationship between the natural resonance frequency f0 of the load circuit 306 and the operation frequency of the inverter circuit 304, when the preheating current is to be supplied, the operation frequency is set to fp which is higher than f0 as shown in FIG. 11. After the timer circuit 374 checks that the operation time of the inverter circuit 304 exceeds the preheating time, the inverter control circuit 372 transfers the operation frequency from fp to fs which is in the vicinity of f0, thereby causing the lamp to be lit ON. According to this setting, the electrodes of the lamp 308 are optimally heated during the predetermined preheating time, and the voltage Vp which is applied between the electrodes during the time can be lowered to a level at which the lamp 308 does not start to discharge. After elapse of the preheating time, the high voltage Vs is applied between the electrodes of the lamp 308, and it is possible to light on the lamp without damaging the electrodes of the lamp 308 and with sureness. Even when the number of lightings of the lamp 308 is increased, therefore, it is possible to avoid the life of the lamp 308 from being shortened.

Figure 13:
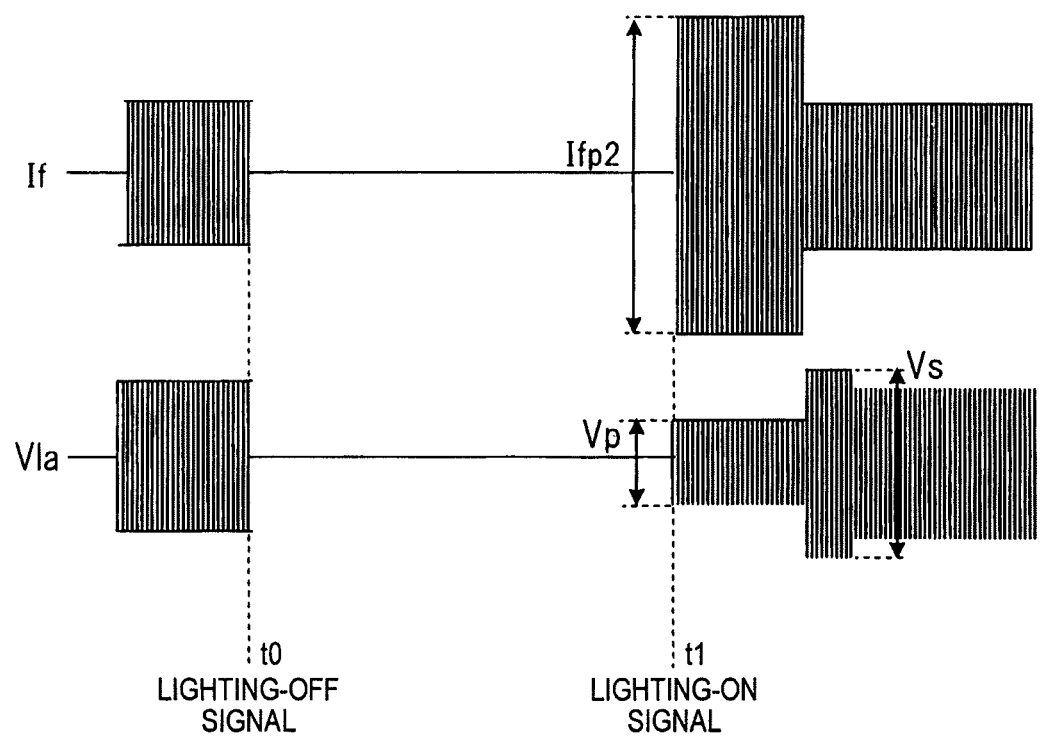
FIG. 13 is a view showing waveforms of the preheating current If and an output voltage Vla in the discharge lamp lighting apparatus of the third embodiment.

When the discharge lamp lighting circuit is configured as described above, it is possible to control so as to form operation waveforms such as shown in FIG. 13. FIG. 13 is a view showing the waveforms of the preheating current If and output voltage Vla of the load circuit 306 in the discharge lamp lighting apparatus of the third embodiment, and shows operation waveforms in relighting after lighting-OFF. At time t0, first, the lighting-OFF controlling unit 310 transmits the lighting-OFF signal to the timer circuit 374 based on the external signal 309 such as a sensor, and, when lighting-OFF is instructed, the inverter control circuit 372 receives the lighting-OFF signal through the timer circuit 374, and stops the inverter circuit 304 to cause the lamp 308 to be lit OFF. In this case, the preheating current If and the output voltage Vla are 0.

At time t1, then, the lighting-OFF controlling unit 310 transmits the lighting-ON signal based on the external signal 309 such as a sensor. In the case where relighting is instructed after lighting-OFF, the inverter control circuit 372 receives the lighting-ON signal through the timer circuit 374, transfers the operation frequency of the inverter circuit 304 to fp, and causes it to operate. The switching element Q4 of the preheating circuit 305 is switched to ON by the preheating control circuit 373. As a relighting preheating current, the second preheating current Ifp2 is supplied to preheat the electrodes of the lamp 308. During the preheating time, the voltage Vp which is applied between the electrodes is at a low level at which the lamp 308 does not start to discharge. After elapse of the preheating time, then, the operation frequency of the inverter circuit 304 is transferred from fp to fs, and the high voltage Vs is applied between the electrodes of the lamp 308, thereby causing the lamp 308 to be again lit ON. Here, the preheating time when the second preheating current Ifp2 is supplied in relighting is set to 0.5 seconds or less.

As described in the paragraph of the problem above, it is preferred as far as possible that the relighting after reception of the lighting-OFF signal from the external signal 309 such as a sensor is performed by instantaneous lighting. As shown in FIGS. 11 and 13, the second preheating current Ifp2 is a preheating current which is larger than the first preheating current Ifp1. When, in relighting, lighting-ON is set so as to be performed only by the second preheating current Ifp2, therefore, instantaneous lighting is enabled in relighting.

In the embodiment, only the case where the preheating current is switched in the two steps has been described. The preheating current may be set to be switched in three or more steps. This is applicable also to embodiments described below.

Fourth Embodiment

In the embodiments described below, the basic circuit configuration is identical with that shown in FIG. 10, and hence detailed description of the circuit will be omitted.

Figure 14:
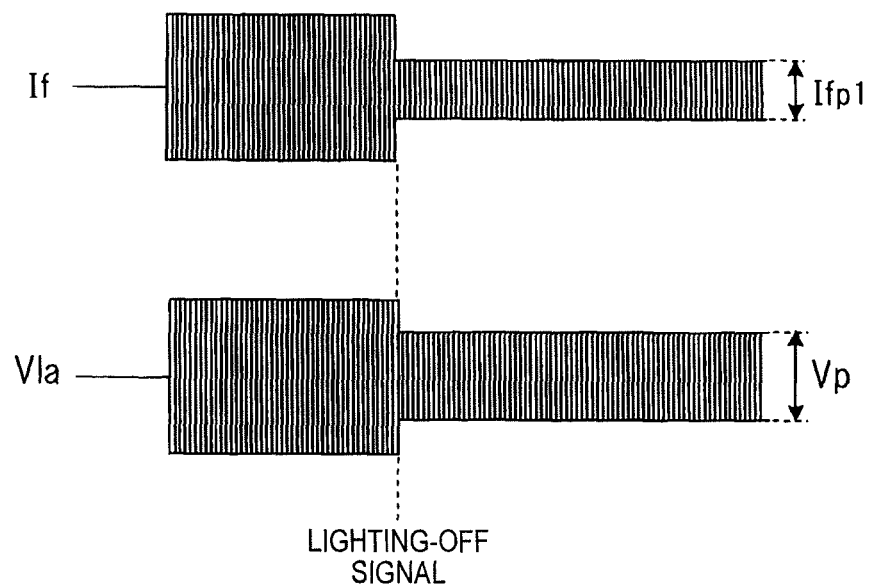
FIG. 14 is a view showing waveforms of a preheating current If and an output voltage Vla in a discharge lamp lighting apparatus of a fourth embodiment of the invention.

The operation waveforms in a fourth embodiment of the invention is shown in FIG. 14. FIG. 14 is a view showing waveforms of the preheating current If and the output voltage Vla in the discharge lamp lighting apparatus of the fourth embodiment, and shows operation waveforms in lighting-OFF.

As shown in FIG. 14, when the timer circuit 374 receives the lighting-OFF signal from the external signal 309 such as a sensor, and lighting-OFF is instructed, the inverter control circuit 372 transfers the operation frequency of the inverter circuit 304 to fp, and lights OFF the lamp 308. Moreover, the switching element Q4 of the preheating circuit 305 is turned OFF by the preheating control circuit 373, and the electrodes of the lamp 308 are preheated while the first preheating current Ifp1 which is smaller is supplied as the lighting-OFF preheating current. In this way, the supply of the first preheating current Ifp1 is continued in lighting-OFF, whereby the power consumption can be reduced and energy saving can be performed. In the case of relighting, the time elapsed before lighting can be shortened. As described also in the third embodiment, the voltage Vp which is applied at this time between the electrodes must be set to a level at which the lamp 308 does not start to discharge.

Fifth Embodiment

Figure 15:
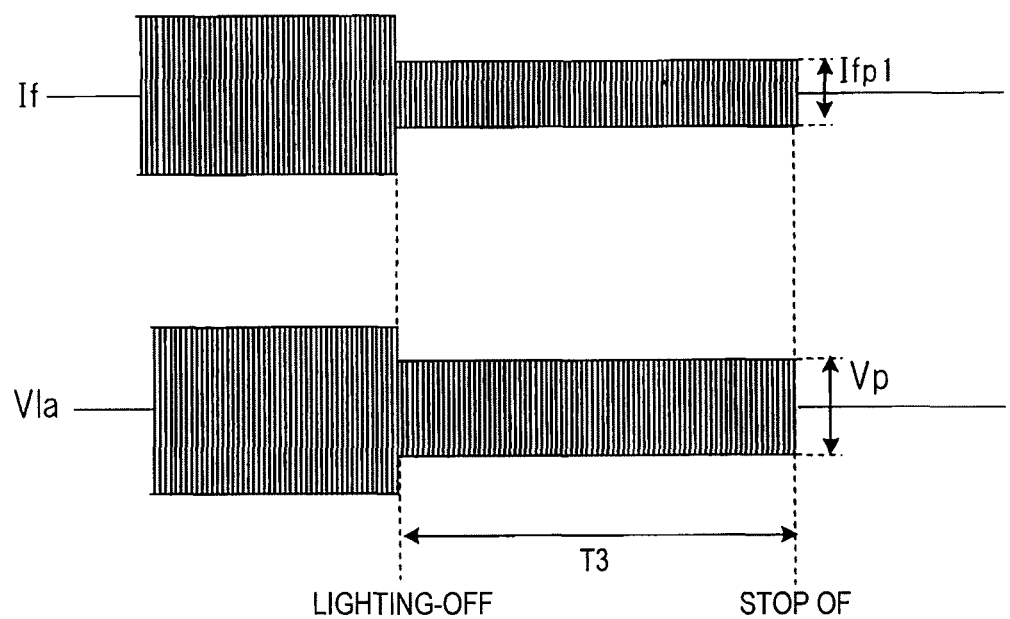
FIG. 15 is a view showing waveforms of a preheating current If and an output voltage Vla in a discharge lamp lighting apparatus of a fifth embodiment of the invention.

The operation waveforms in a fifth embodiment of the invention are shown in FIG. 15. FIG. 15 is a view showing waveforms of the preheating current If and the output voltage Vla in the discharge lamp lighting apparatus of the fifth embodiment, and shows operation waveforms in relighting after lighting-OFF. Similarly with the fourth embodiment, when the timer circuit 374 receives the lighting-OFF signal from the external signal 309 such as a sensor, and lighting-OFF is instructed, the inverter control circuit 372 lights OFF the lamp 308, and continues the supply of the preheating current by the first preheating current Ifp1.

In the fifth embodiment, the timer circuit 374 stores a predetermined time T3 (preheating stop time) which is a constant value. The preheating stop time T3 is compared with a measured preheating time. When the preheating time exceeds the preheating stop time T3, the inverter control circuit 372 stops the inverter circuit 304 to stop the discharge lamp lighting apparatus. In order to suppress the increase of the power consumption, for example, the predetermined preheating stop time T3 is set to about 1 minute. In the case where relighting is instructed before exceeding the preheating stop time T3, however, the switching element Q4 is turned ON by the preheating control circuit 373 in a similar manner as the third embodiment, and the electrodes of the lamp 308 are preheated by the second preheating current Ifp2 to perform relighting. In this way, after elapse of the preheating stop time, the supply of the preheating current Ifp1 is stopped, whereby the increase of the power consumption can be suppressed.

Sixth Embodiment

Figure 16:
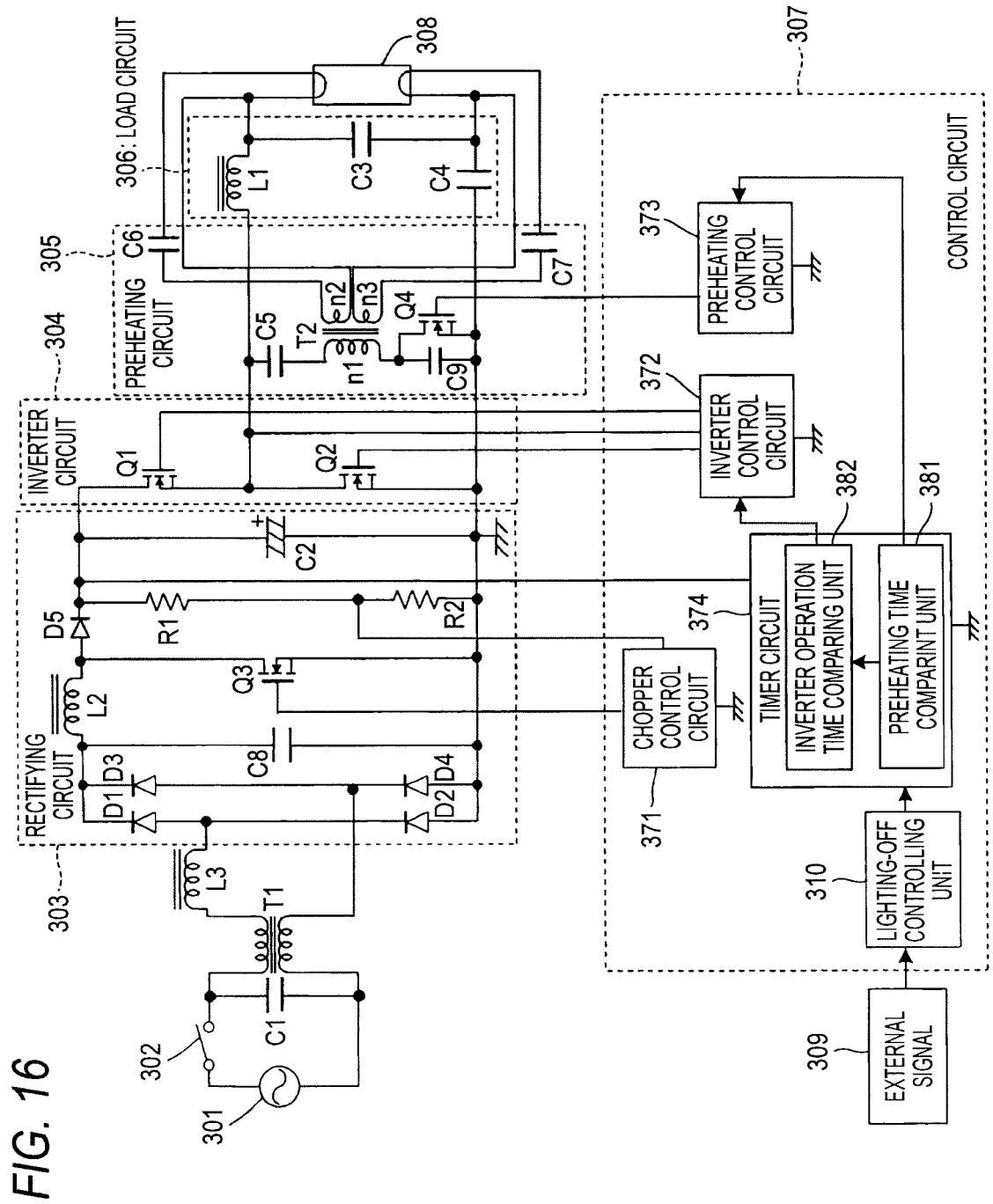
FIG. 16 is a diagram showing a schematic configuration of a discharge lamp lighting apparatus of a sixth embodiment of the invention.
Figure 17:
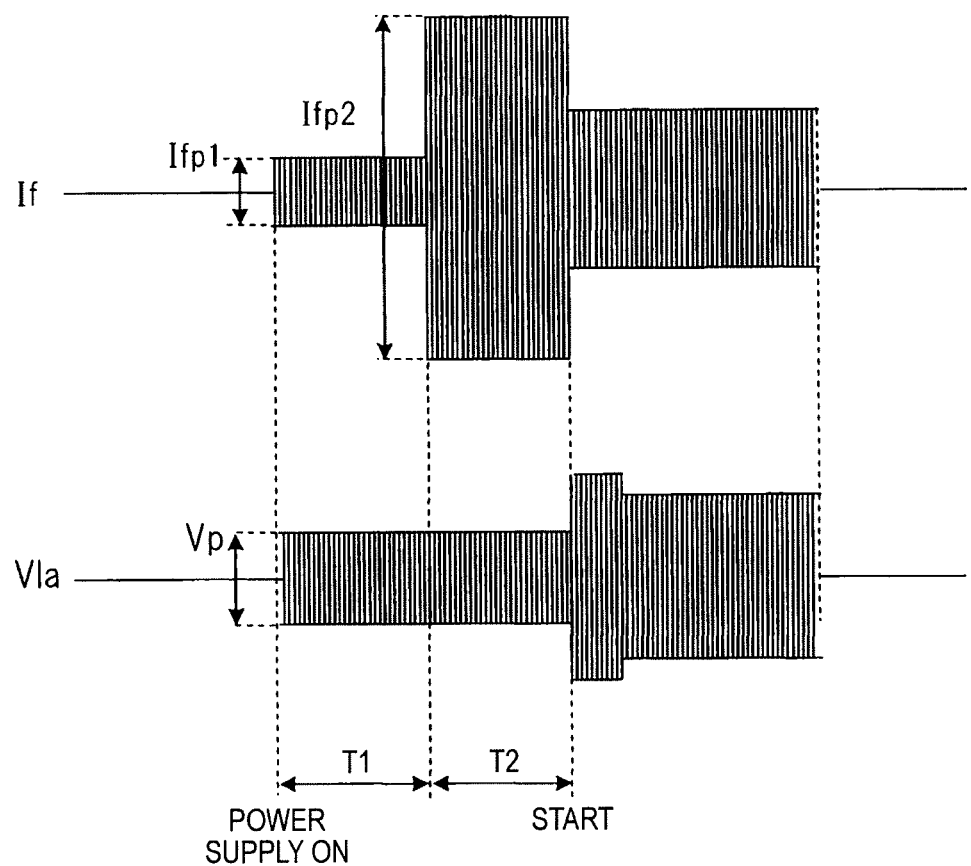
FIG. 17 is a view showing waveforms of a preheating current If and an output voltage Vla in the discharge lamp lighting apparatus of the sixth embodiment of the invention.

The configuration of a sixth embodiment of the invention is shown in FIG. 16, and the operation waveforms are shown in FIG. 17. FIG. 16 is a diagram showing a schematic configuration of a discharge lamp lighting apparatus of the sixth embodiment of the invention. FIG. 17 is a view showing waveforms of the preheating current If and the output voltage Vla in the discharge lamp lighting apparatus of the sixth embodiment, and shows operation waveforms in turn-ON of the power supply.

In the sixth embodiment, in addition to the configuration of the third embodiment shown in FIG. 10, a preheating time comparing unit 381 and an inverter operation time comparing unit 382 are disposed in the timer circuit 374. The other configuration is identical with FIG. 10.

As shown in FIG. 17, the timer circuit 374 stores predetermined times T1 (first lighting-ON preheating time) and T2 (second lighting-ON preheating time) which are constant values. The preheating time comparing unit 381 compares the first lighting-ON preheating time T1 and the second lighting-ON preheating time T2 with the measured preheating time. At turn-on of the power supply, the preheating time comparing unit 381 compares the first lighting-ON preheating time T1 with the measured preheating time and, until the preheating time exceeds the first lighting-ON preheating time T1, the preheating control circuit 373 turns OFF the switching element Q4 of the preheating circuit 305, and the first preheating current Ifp1 is supplied as a first lighting-ON preheating current to the electrodes of the lamp 308 to preheat the electrodes. When the preheating time exceeds the first lighting-ON preheating time T1, the preheating control circuit 373 turns ON the switching element Q4, and the preheating current is switched to the second preheating current Ifp2 as a second lighting-ON preheating current, and then supplied to the electrodes of the lamp 308. Then, the preheating time comparing unit 381 compares the second lighting-ON preheating time T2 with the measured preheating time, and, until the preheating time exceeds the second lighting-ON preheating time T2, the preheating control circuit 373 supplies the second preheating current Ifp2 as the second lighting-ON preheating current to preheat the lamp 308.

Furthermore, the inverter operation time comparing unit 382 compares the first lighting-ON preheating time T1 and the second lighting-ON preheating time T2 with the measured operation time of the inverter circuit. Until the comparison of the inverter operation time comparing unit 382 detects the elapses of the first lighting-ON preheating time T1 and the second lighting-ON preheating time T2, the inverter control circuit 372 causes the inverter circuit 304 to operate while setting the operation frequency to fp. After the ends of the first lighting-ON preheating time T1 and the second lighting-ON preheating time T2, the operation frequency of the inverter circuit 304 is transferred to fs, the high voltage Vs is applied between the electrodes of the lamp 308 to cause the lamp 308 to start.

As described above, according to the sixth embodiment, only when the power supply is turned ON, the first preheating current Ifp1 is supplied during the predetermined period of the first lighting-ON preheating time T1, so that the electrodes are preheated to some extent, and then the second preheating current Ifp2 is supplied during the period of the second lighting-ON preheating time T2, so that, when the power supply is turned ON, the preheating current is stepwisely increased, whereby a problem in that the life of the lamp is shortened can be avoided. Here, the first preheating current Ifp1 may be 0. Moreover, the first lighting-ON preheating time T1 when the first preheating current Ifp1 is supplied, and the second lighting-ON preheating time T2 when the second preheating current Ifp2 is supplied must be set to a degree at which the user feels unpleasant. In the case where the power supply is turned ON, for example, it is preferable that the first and second lighting-ON preheating times T1, T2 are set to about 2 seconds or less in total.

Seventh Embodiment

Figure 18:
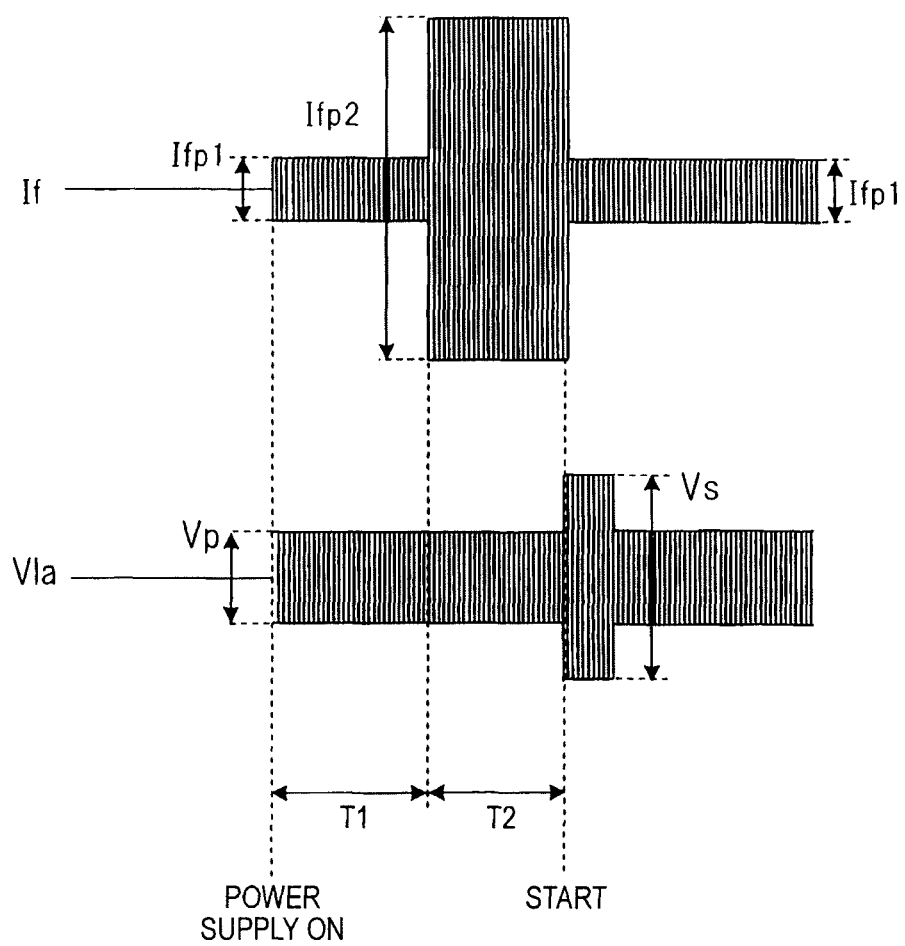
FIG. 18 is a view showing waveforms of a preheating current If and an output voltage Vla when the power supply is turned ON in a discharge lamp lighting apparatus of a seventh embodiment of the invention.
Figure 19:
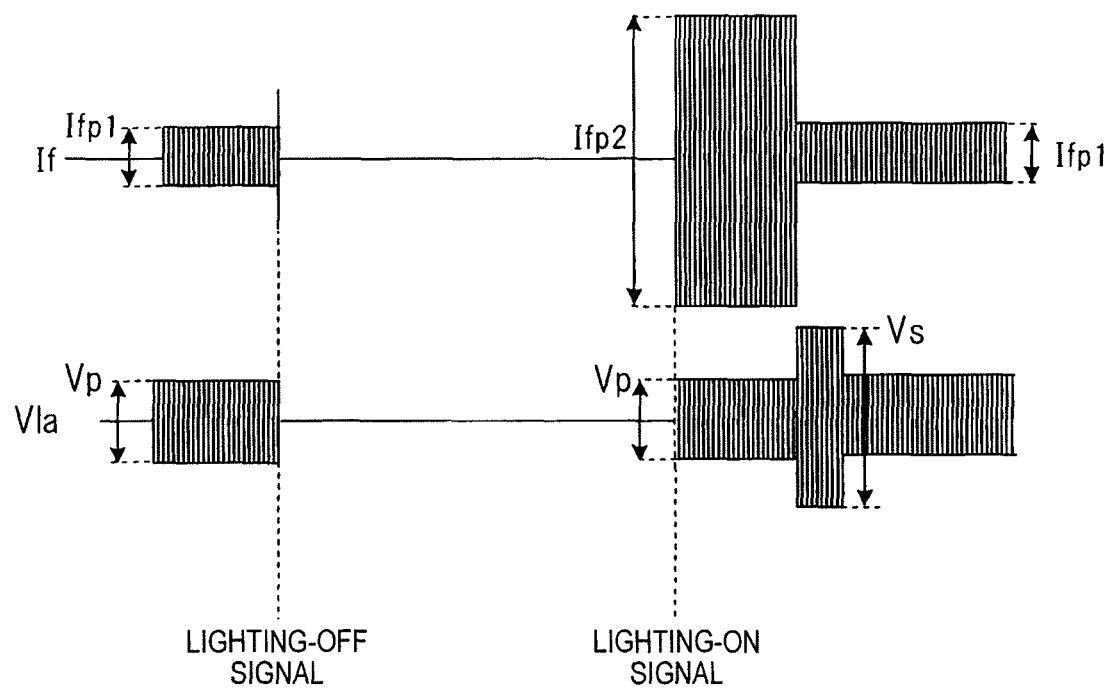
FIG. 19 is a view showing waveforms of the preheating current If and the output voltage Vla in a period from lighting-OFF to relighting in the discharge lamp lighting apparatus of the seventh embodiment.

The operation waveforms in a seventh embodiment of the invention are shown in FIGS. 18 and 19. FIG. 18 is a view showing waveforms of the preheating current If and the output voltage Vla when the power supply is turned ON in a discharge lamp lighting apparatus of the seventh embodiment, and FIG. 19 is a view showing waveforms of the preheating current If and the output voltage Vla in a period from lighting-OFF to relighting in the discharge lamp lighting apparatus of the seventh embodiment.

As shown in FIG. 18, in the case where, immediately after the power supply is turned ON, the operation is transferred in the sequence of preheating→start→lighting, the inverter control circuit 372 switches the operation frequency of the inverter circuit 304 based on the time measured by the timer circuit 374 so as to attain fp in preheating→fs in start→fp in lighting. In the case of the inverter operation frequency fp in lighting, the preheating control circuit 373 turns OFF the switching element Q4 of the preheating circuit 305, and the first preheating current Ifp1 is supplied as a preheating current during lighting.

Moreover, as shown in FIG. 19, in the case where the lighting-ON signal is received after the lighting-OFF signal to perform relighting, in a similar manner as the above-described case of lighting, the preheating control circuit 373 turns OFF the switching element Q4 of the preheating circuit 305, and the first preheating current Ifp1 is supplied as the preheating current during lighting.

As described above, in the seventh embodiment, during lighting, the first preheating current Ifp1 which is smaller than the second preheating current Ifp2 is supplied as the preheating current. Therefore, also the power consumption during lighting can be reduced.

Eighth Embodiment

Figure 20:
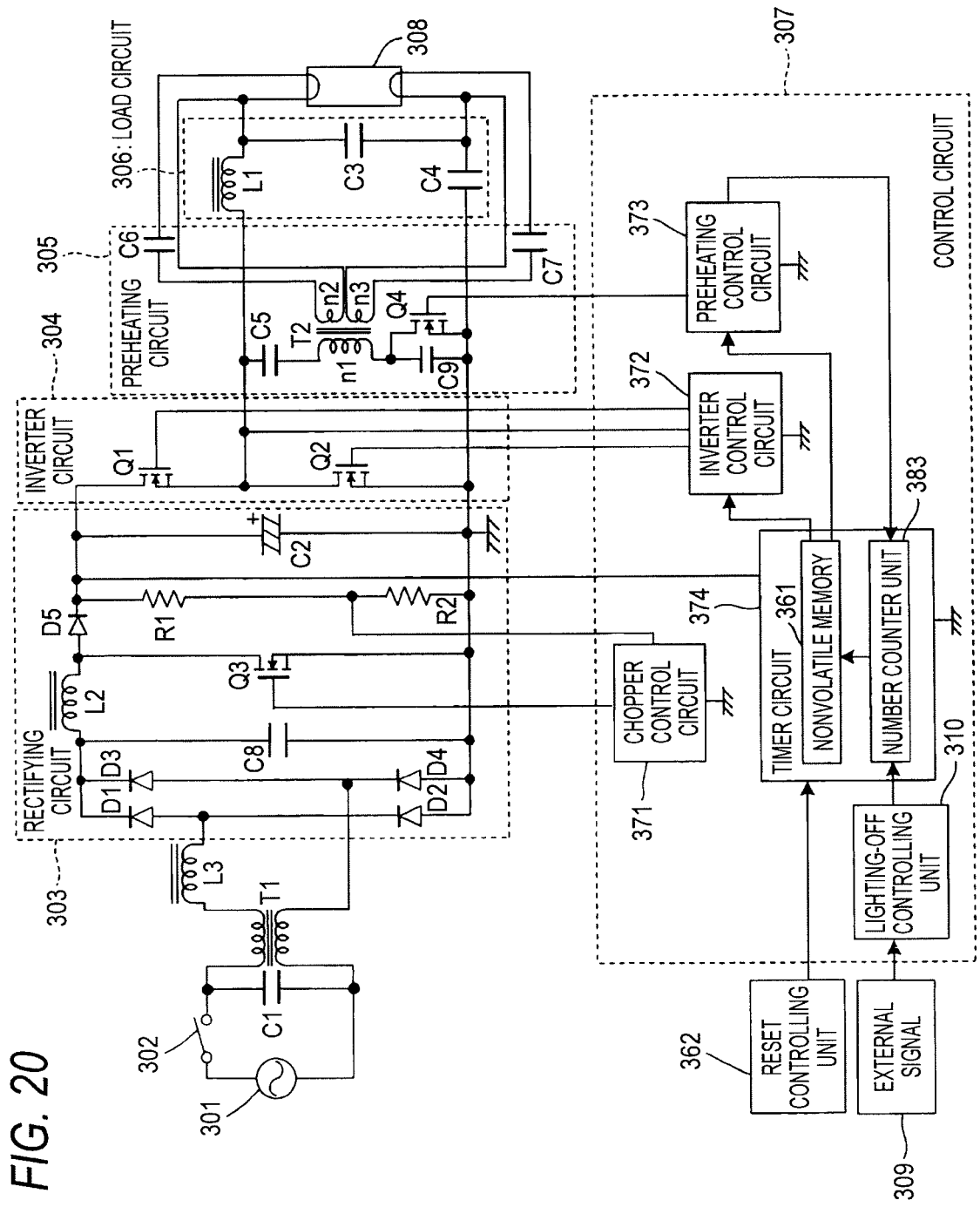
FIG. 20 is a diagram showing a schematic configuration of a discharge lamp lighting apparatus of an eighth embodiment of the invention.
Figure 21:
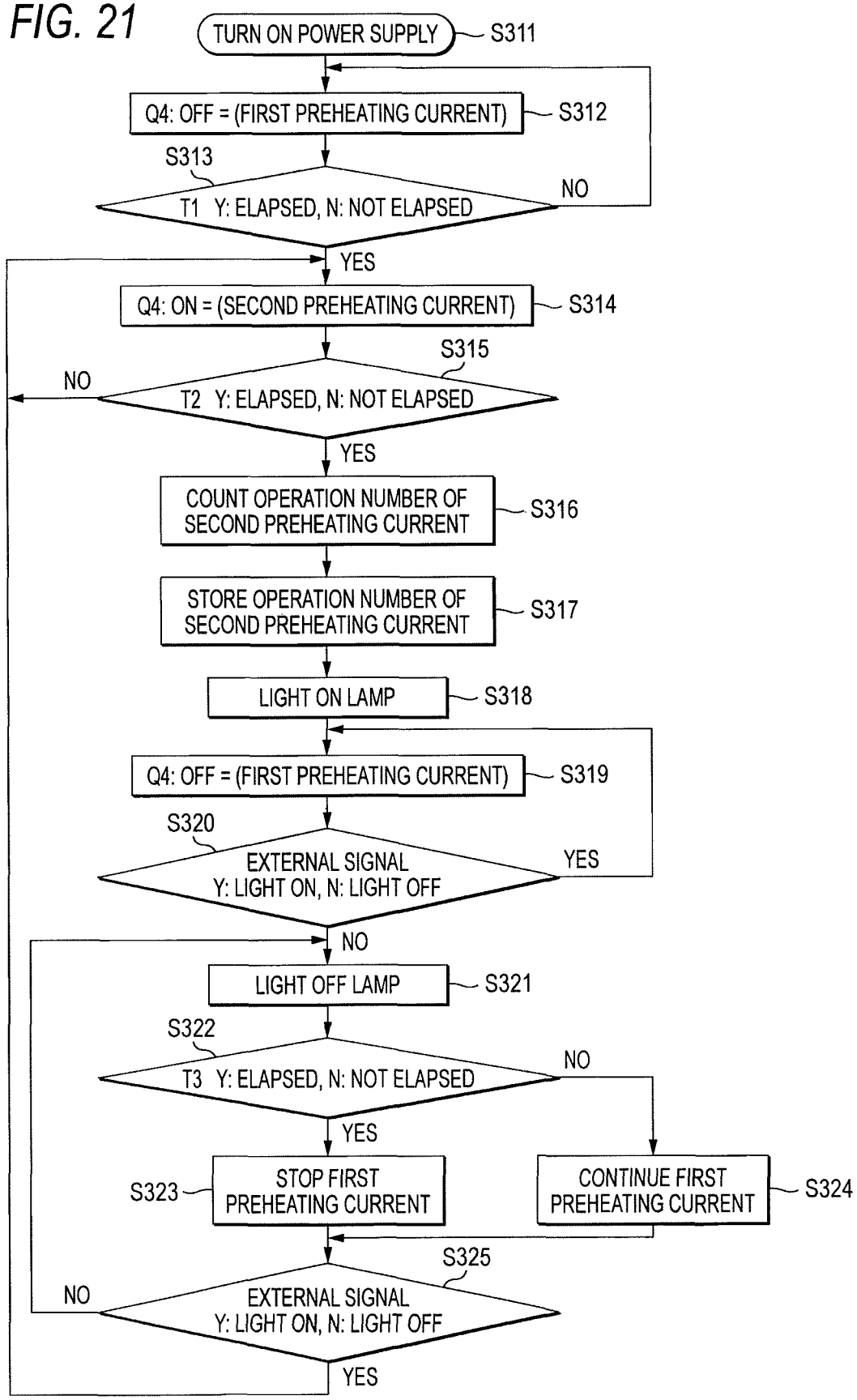
FIG. 21 is a flowchart illustrating a first example of the operation of the discharge lamp lighting apparatus of the eighth embodiment.
Figure 22:
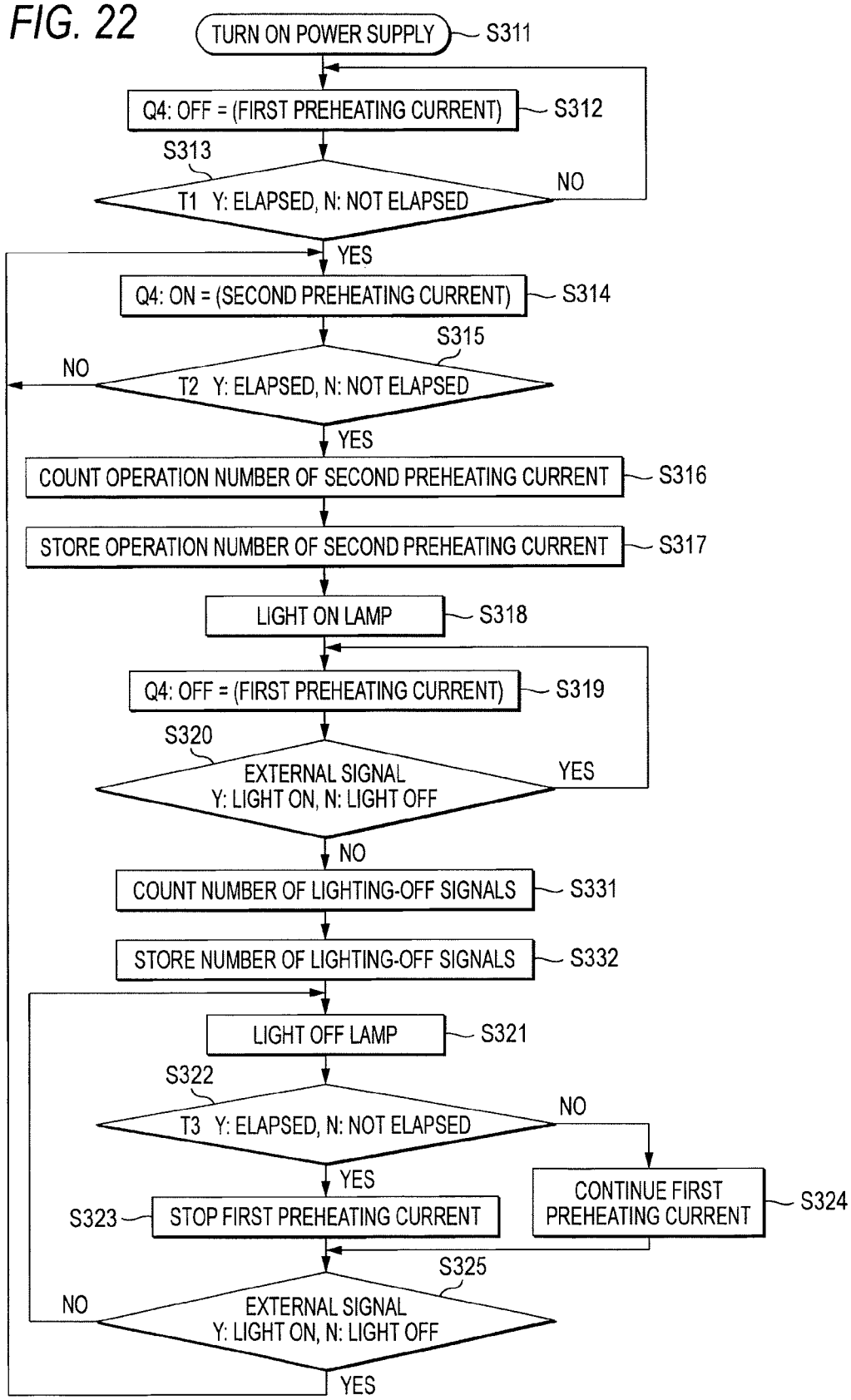
FIG. 22 is a flowchart illustrating a second example of the operation of the discharge lamp lighting apparatus of the eighth embodiment.

The configuration of an eighth embodiment of the invention is shown in FIG. 20, and the operation flowchart is shown in FIGS. 21 and 22. FIG. 20 is a diagram showing a schematic configuration of the discharge lamp lighting apparatus of the eighth embodiment of the invention, FIG. 21 is a flowchart illustrating a first example of the operation of the discharge lamp lighting apparatus of the eighth embodiment, and FIG. 22 is a flowchart illustrating a second example of the operation of the discharge lamp lighting apparatus of the eighth embodiment.

In the eighth embodiment, in addition to the configuration of the third embodiment shown in FIG. 10, a number counter unit 383 and a nonvolatile memory 361 are disposed in the timer circuit 374, and a reset controlling unit 362 which resets an accumulated number stored in the nonvolatile memory 361 is disposed. The other configuration is identical with FIG. 10.

The number counter unit 383 counts the lighting-OFF signal from an external signal 309 such as a sensor, or the operation number of the second preheating current Ifp2. The nonvolatile memory 361 sequentially stores the number of the counted lighting-OFF signals, or the operation number of the second preheating current Ifp2. In accordance with the number, the control circuit 307 can freely change at least the second lighting-ON preheating time T2 when the second preheating current Ifp2 is supplied, or the supply amount of the second preheating current Ifp2.

In the case where, for example, the lamp 308 is replaced with a new one, the reset controlling unit 362 performs an operation of resetting the accumulated number stored in the nonvolatile memory 361 to the initial value (the state where the accumulated number is zero). As the reset operation, specifically, there are a resetting method which is performed by an operation of a reset button, a method in which the end-of-life state of the lamp 308 is detected and resetting is automatically performed, that in which resetting is performed by a predetermined ON/OFF operation of the power supply, and the like. Usually, the nonvolatile memory 361 can be configured by a nonvolatile memory such as a general purpose EEPROM, or a flash memory incorporated in a microprocessor.

Next, the operation of the eighth embodiment will be described in detail with reference to FIGS. 21 and 22. First, the first example shown in FIG. 21 is an example in which only the operation number of the second preheating current is used. In the first example, when the power supply us turned ON (step S311), the preheating control circuit 373 turns OFF the switching element Q4 of the preheating circuit 305, and the first preheating current Ifp1 is supplied (step S312). Then, it is determined whether the first lighting-ON preheating time T1 has elapsed or not (step S313). If the time T1 has elapsed (step S313: Y), the preheating control circuit 373 turns ON the switching element Q4, and the second preheating current Ifp2 is supplied (step S314). Thereafter, it is determined whether the second lighting-ON preheating time T2 has elapsed or not (step S315). If the time T2 has elapsed (step S315: Y), the number counter unit 383 counts the number at which the second preheating current Ifp2 operates (step S316), and the operation number is stored in the nonvolatile memory 361 (step S317). At this time, as shown in, for example, Table 3, the timer circuit 374 can change the second preheating current time T2 in accordance with the operation number of the second preheating current.

TABLE 3

| Operation Number of Second Preheating Current counted by Number Counter Unit 383 | Second Preheating Time T2 |
|---|---|
| 10,000 | 0.1 second |
| 20,000 | 0.2 second |
| 30,000 | 0.3 second |
| 40,000 | 0.4 second |

As the operation number of the second preheating current which is counted by the number counter unit 383 and stored in the nonvolatile memory 361 as described above is more increased, the time of the second preheating current time T2 is further prolonged. Therefore, the time for preheating the electrodes is long, and hence a problem in that the life of the lamp is shortened can be avoided.

Then, the inverter control circuit 372 applies the high voltage Vs between the electrodes of the lamp 308 to light on the lamp 308 (step S318). At this time, during the preheating time, the operation frequency of the inverter circuit 304 is set to fp, and, after elapse of the preheating time, the operation frequency of the inverter circuit 304 is transferred from fp to fs, thereby causing the lamp 308 to be lit ON.

During the lighting of the lamp, the preheating control circuit 373 turns OFF the switching element Q4, and the first preheating current Ifp1 is supplied (step S319). Thereafter, the lighting-OFF controlling unit 310 determines whether the external signal is the lighting-ON signal or the lighting-OFF signal (step S320). If the external signal is the lighting-OFF signal (step S320: N), the inverter control circuit 372 controls the inverter circuit 304 so as to light OFF the lamp (step S321).

Then, it is determined whether the preheating stop time T3 has elapsed or not (step S322). If the time T3 has elapsed (step S322: Y), the preheating control circuit 373 stops the supply of the first preheating current Ifp1 (step S323). By contrast, if the time T3 has not elapsed (step S322: N), the preheating control circuit 373 continues the supply of the first preheating current Ifp1 (step S324). Thereafter, the lighting-OFF controlling unit 310 determines whether the external signal is the lighting-ON signal or the lighting-OFF signal (step S325). If the external signal is the lighting-ON signal (step S325: Y), the process returns to step S314 to supply the second preheating current Ifp2. By contrast, if the external signal is the lighting-OFF signal (step S325: N), the process returns to step S321 to light OFF the lamp.

The second example shown in FIG. 22 is a modification of the first example of FIG. 21, and an example in which the number of the lighting-OFF signals is used together with the operation number of the second preheating current. Here, only portions different from FIG. 21 will be described. In the second example, if it is determined in step S320 that the external signal is the lighting-OFF signal, the number counter unit 383 counts the number at which the lighting-OFF signal is input (step S331), and the number is stored in the nonvolatile memory 361 (step S332). At this time, as shown in, for example, Table 4, the timer circuit 374 can change the second preheating current time T2 in accordance with the number of the lighting-OFF signals.

TABLE 4

| Number of Lighting-Off by External Signal 309 counted by Number Counter Unit 383 | Second Preheating Time T2 |
|---|---|
| 10,000 | 0.1 second |
| 20,000 | 0.2 second |
| 30,000 | 0.3 second |
| 40,000 | 0.4 second |

As the number of the lighting-OFF signals which is counted by the number counter unit 383 and stored in the nonvolatile memory 361 as described above is more increased, the time of the second preheating current time T2 is further prolonged. Therefore, the time for preheating the electrodes is long, and hence a problem in that the life of the lamp is shortened can be avoided.

According to the embodiment, as described above, the second preheating current time T2 can be changed in accordance with the operation number of the second preheating current or the number of the lighting-OFF signals. When, as shown in FIG. 11, the operation frequency of the inverter circuit 304 is changed, furthermore, also the supply amount of the second preheating current Ifp2 can be freely changed. For example, the operation number of the second preheating current or the number of the lighting-OFF signals is stored in the nonvolatile memory 361. As the number is more increased, the operation frequency fp of the inverter circuit 304 may be gradually transferred to a higher frequency, whereby also the supply amount of the second preheating current Ifp2 can be increased. According to this setting, similarly, it is possible to achieve the effect that the life of the lamp can be prevented from being shortened.

Ninth Embodiment

Figure 23:
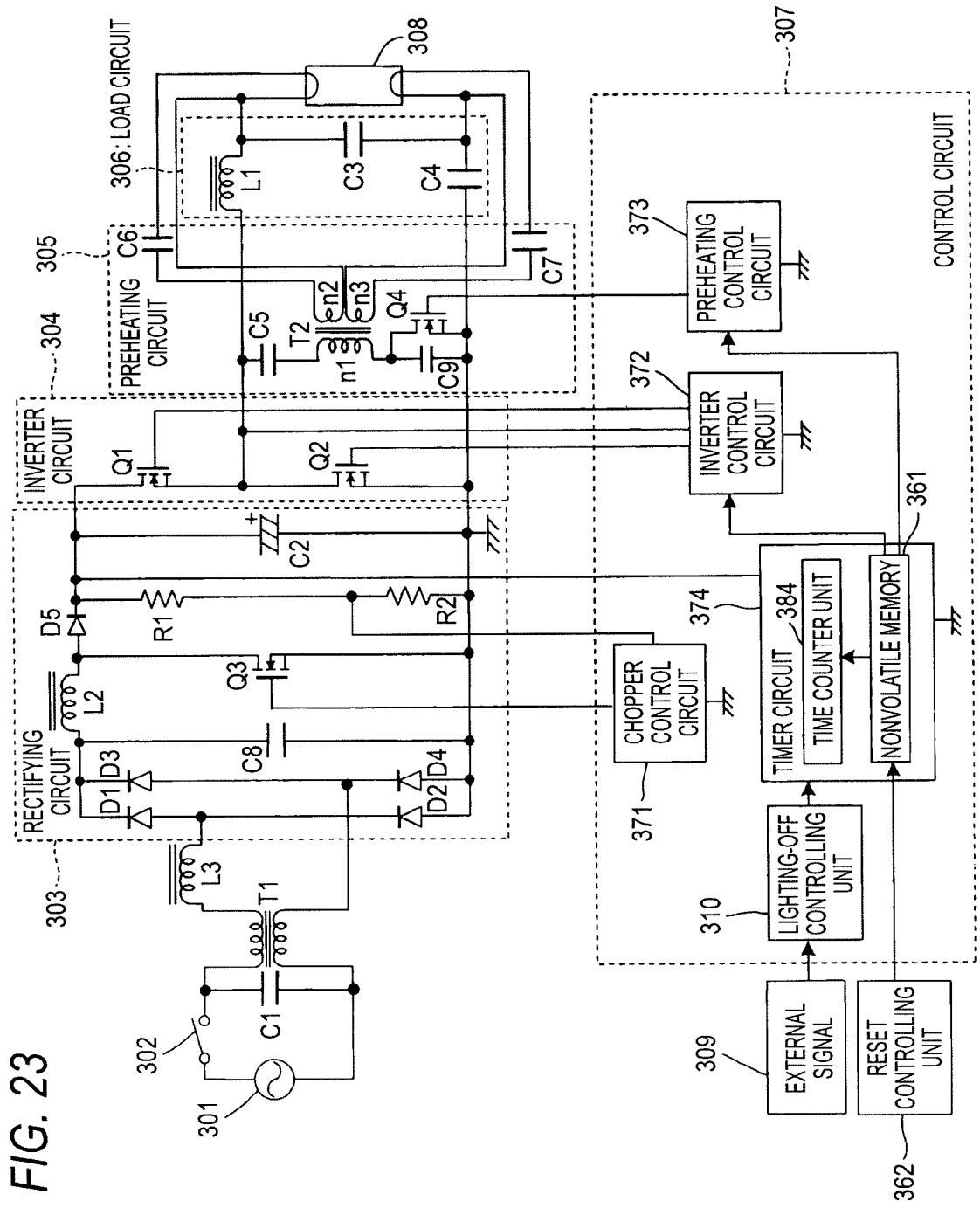
FIG. 23 is a diagram showing a schematic configuration of a discharge lamp lighting apparatus of a ninth embodiment of the invention.
Figure 24:
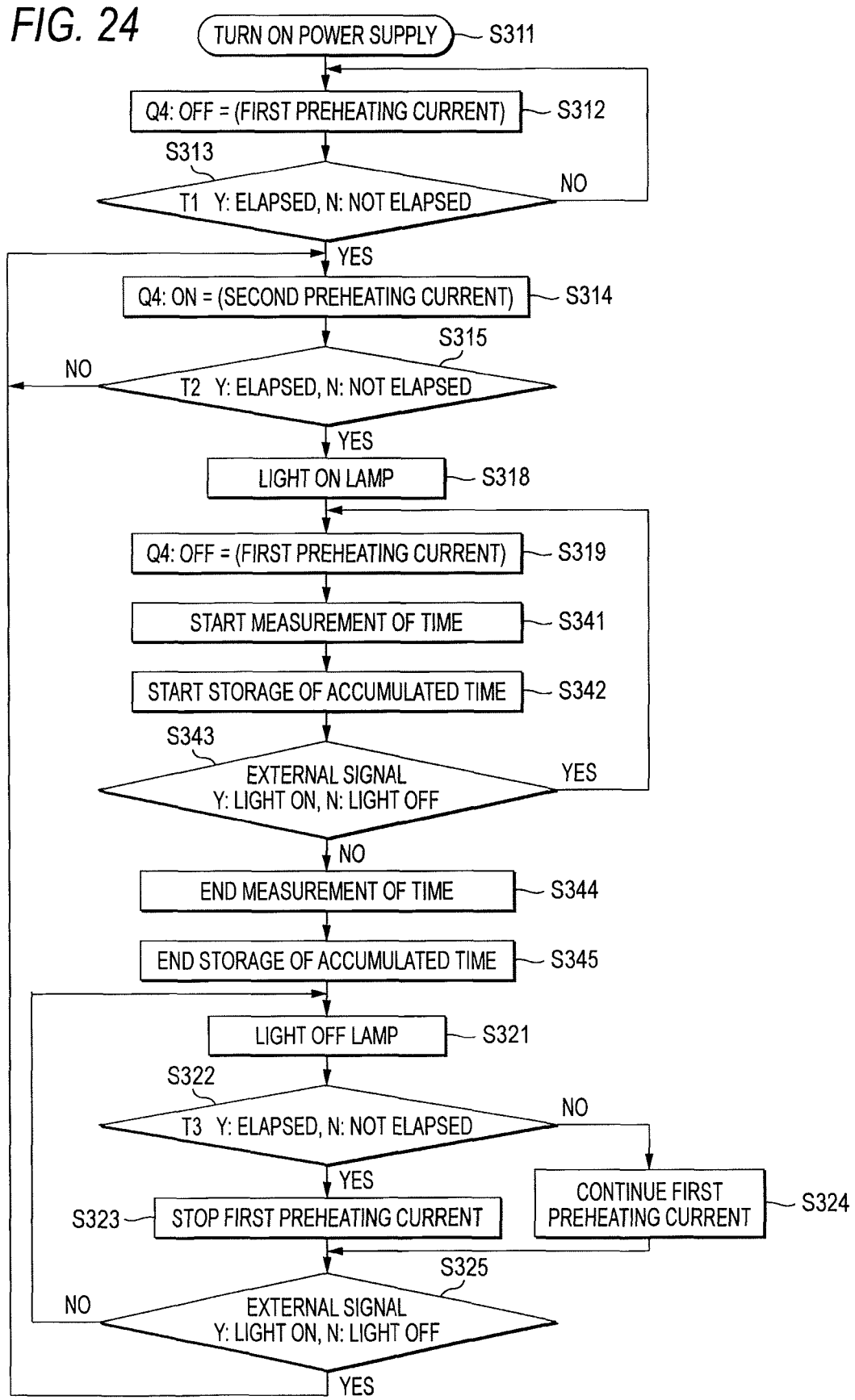
FIG. 24 is a flowchart illustrating the operation of the discharge lamp lighting apparatus of the ninth embodiment.
Figure 25:
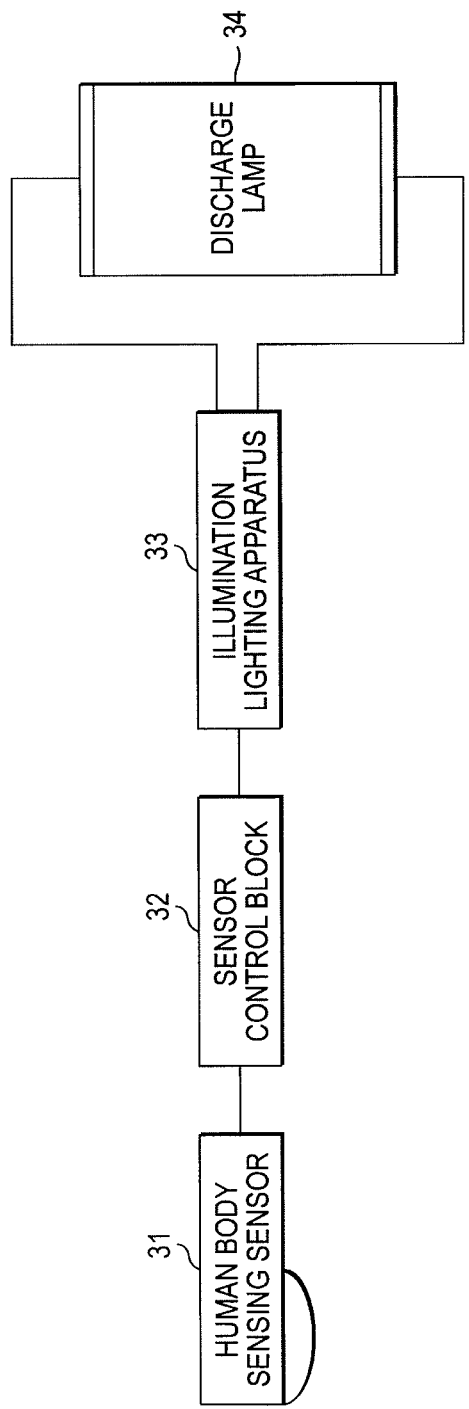
FIG. 25 is a diagram showing a schematic configuration of a conventional illumination system using a human body sensing sensor.
Figure 26:
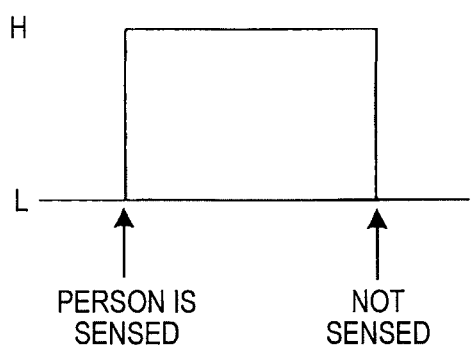
FIG. 26 is a view showing a signal which is output from the human body sensing sensor to a sensor control block in the conventional illumination system.
Figure 28:
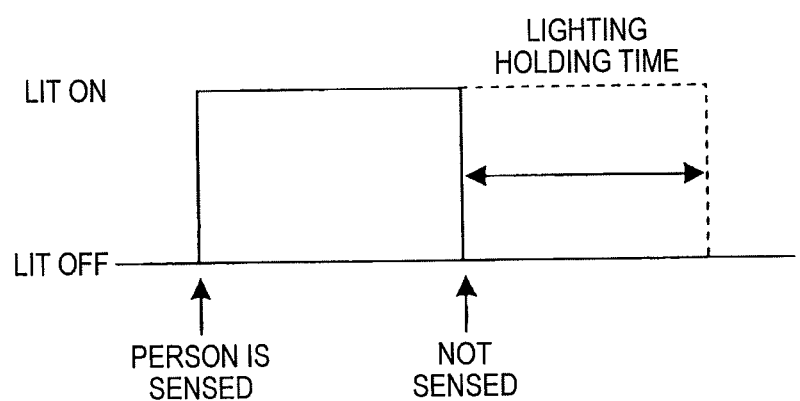
FIG. 28 is a view illustrating a lighting holding time in the case where a person begins not to be sensed by the human body sensing sensor, in the conventional illumination system.
Figure 29:
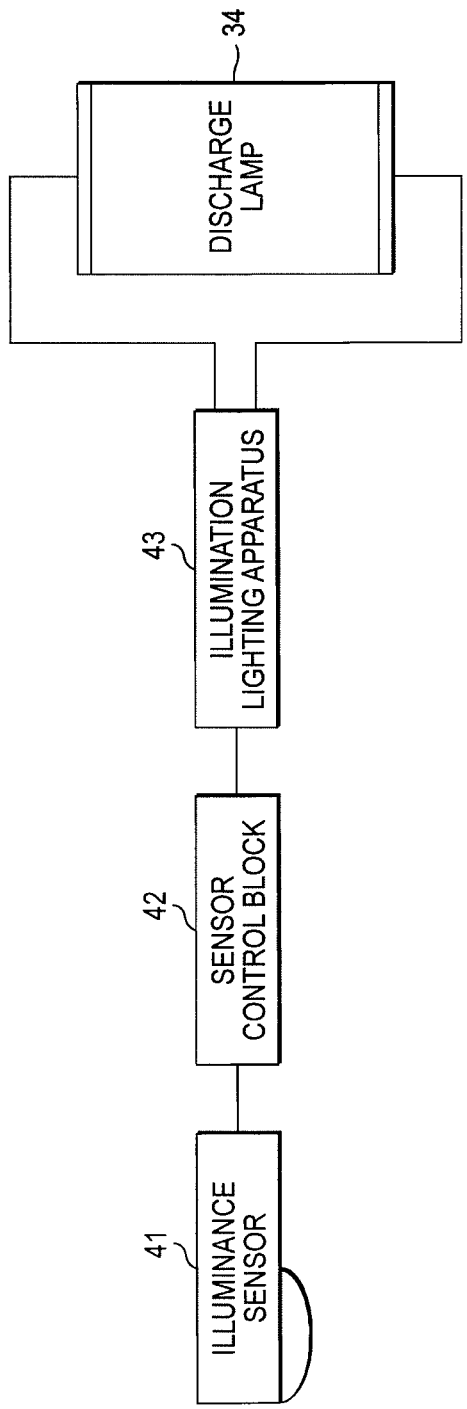
FIG. 29 is a diagram showing a schematic configuration of a conventional illumination system using an illuminance sensor.
Figure 33:
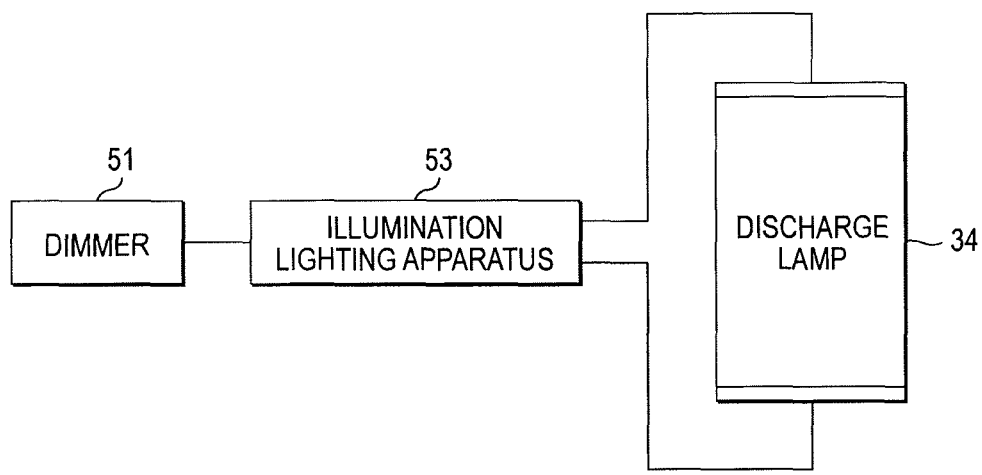
FIG. 33 is a diagram showing a schematic configuration of a conventional illumination system using a dimmer.

The configuration of a ninth embodiment of the invention is shown in FIG. 23, and the operation flowchart is shown in FIG. 24. FIG. 23 is a diagram showing a schematic configuration of the discharge lamp lighting apparatus of the ninth embodiment of the invention, and FIG. 24 is a flowchart illustrating the operation of the discharge lamp lighting apparatus of the ninth embodiment.

The ninth embodiment is a modification of the eighth embodiment shown FIG. 20. In the timer circuit 374, a time counter unit 384 is disposed in place of the number counter unit 383. The other configuration is identical with FIG. 20.

The time counter unit 384 counts the lighting time of discharge lamp based on the output of the rectifying circuit 303. When the time counter unit 384 of the timer circuit 374 receives the DC voltage from the rectifying circuit 303, the lighting time begins to be counted. Alternatively, the lighting time based on the lighting-ON signal or lighting-OFF signal due to the external signal 309 such as a sensor may be counted. The nonvolatile memory 361 sequentially stores the counted lighting time of the discharge lamp as an accumulated lighting time.

Next, the operation of the ninth embodiment will be described in detail with reference to FIG. 24. Here, only portions different from the eighth embodiment shown in FIGS. 21 and 22 will be described.

In the state where the lamp is lit ON in step S318 and the first preheating current Ifp1 is supplied in step S319, the time counter unit 384 measures the lighting time of the lamp (step S341), and the lighting time is stored in the nonvolatile memory 361 (step S342). At this time, as shown in, for example, Table 5, the timer circuit 374 can change the second preheating current time T2 in accordance with the lighting time of the lamp.

TABLE 5

| Lighting Time of Lamp counted by Time Counter Unit 384 | Second Preheating Time T2 |
|---|---|
| 20,000 hours | 0.1 second |
| 40,000 hours | 0.2 second |
| 60,000 hours | 0.3 second |
| 80,000 hours | 0.4 second |

As the accumulated lighting time which is counted by the time counter unit 384 and stored in the nonvolatile memory 361 as described above is longer, the time of the second preheating current time T2 is further prolonged. Therefore, the time for preheating the electrodes is long, and hence a problem in that the life of the lamp is shortened can be avoided.

Thereafter, the lighting-OFF controlling unit 310 determines whether the external signal is the lighting-ON signal or the lighting-OFF signal (step S343). If the external signal is the lighting-OFF signal (step S343: N), the time counter unit 384 ends the measurement of the lighting time of the lamp (step S344), and the nonvolatile memory 361 ends the storage of the accumulated lighting time (step S345). In step S321, then, the inverter control circuit 372 controls the inverter circuit 304 so as to light OFF the lamp.

When the operation frequency of the inverter circuit 304 is changed in accordance with the accumulated lighting time similarly with the eighth embodiment, also the supply amount of the second preheating current Ifp2 can be freely changed. For example, the accumulated lighting time is stored in the nonvolatile memory 361. As the time becomes longer, the operation frequency fp of the inverter circuit 304 may be gradually transferred to a higher frequency, whereby also the supply amount of the second preheating current Ifp2 can be increased. According to this setting, similarly, it is possible to achieve the effect that the life of the lamp can be prevented from being shortened.

As described above, in the ninth embodiment, in accordance with the accumulated lighting time of the lamp, at least the preheating time T2 for supplying the second preheating current Ifp2, or the supply amount of the second preheating current Ifp2 can be freely changed, and hence the life of the lamp can be prevented from being shortened.

In the above-described third to ninth embodiments, the components of the control circuit 307, such as the chopper control circuit 371, the inverter control circuit 372, the preheating control circuit 373, the timer circuit 374, and the lighting-OFF controlling unit 310 can be easily configured by using a microcomputer. When processes corresponding to the operations are executed by a processor and programs operating thereon, the functions of the above-described embodiments can be realized.

According to the discharge lamp lighting apparatus of the embodiment, as described above, the preheating current which is to be supplied to the electrodes can be switched in two or more steps, and, when the lamp is to be re-lit after lighting-OFF due to at least the sensor signal, a larger preheating current can be supplied for a short preheating time. A less preheating current is supplied during a lamp lighting time and a waiting and preheating time. Therefore, the power consumption can be reduced and energy saving can be performed.

The invention is not limited to the matters described in the embodiments. In the invention, it is expected that those skilled in the art will change or apply the matters based on the description in the description and the well-known technique, and such a change or application is included in the range to be protected.

The application is based on Japanese Patent Application (No. 2008-161900) filed Jun. 20, 2008, and Japanese Patent Application (No. 2008-216290) filed Aug. 26, 2008 and their disclosures are incorporated herein by reference.

DESCRIPTION OF REFERENCE SYMBOLS 1, 2 illumination system
11, 21 illumination lighting apparatus
12, 22 external apparatus
13 discharge lamp
119, 219 input signal processing unit
120, 220 external-apparatus determining unit
121, 221 human body sensing sensor
122, 222 illuminance sensor 123, 223 dimmer
301 commercial power supply
302 switch
303 rectifying circuit
304 inverter circuit
305 preheating circuit
306 load circuit
307 control circuit
308 lamp
309 external signal
310 lighting-OFF controlling unit
361 nonvolatile memory
362 reset controlling unit
371 chopper control circuit
372 inverter control circuit
373 preheating control circuit
374 timer circuit
381 preheating time comparing unit
382 inverter operation time comparing unit
383 number counter unit
384 time counter unit

The invention claimed is:

1. An illumination lighting apparatus which is connected to, as an external apparatus, any of a human body sensing sensor configured to detect presence/absence of a person, an illuminance sensor configured to detect space illuminance, and a dimmer which arbitrarily adjusts the space illuminance, said illumination lighting apparatus comprising:

an external apparatus determiner configured to determine which kind of the external apparatus is connected based on a lighting operation control signal which is unique to the external apparatus and which is output from the external apparatus; and a signal processor configured to produce an output control signal for controlling an optical output of a light source, wherein the external apparatus determiner determines the kind of the connected external apparatus based on frequency or voltage of the lighting operation control signal input to the external apparatus determiner, and informs the signal processor of the determined kind, and wherein the signal processor produces the output control signal based on the lighting operation control signal so as to correspond to the informed kind of the external apparatus.

2. The illumination lighting apparatus according to claim 1, wherein a signal form of the lighting operation control signal output from the human body sensing sensor is a binary signal for lighting ON or OFF the light source in accordance with the presence/absence of the person, wherein a signal form of the lighting operation control signal output from the illuminance sensor is a DC voltage which is changed in accordance with the space illuminance and controls the output of the light source so as to make the space illuminance constant, wherein a signal form of the lighting operation control signal output from the dimmer is a pulse width modulated (PWM) signal in which a duty ratio is changed to control the output of the light source and of which a frequency for controlling the space illuminance to a desired value is constant, and wherein the external apparatus determiner determines the kind of the external apparatus depending on which one of the signal forms is used in the lighting operation control signal.

3. The illumination lighting apparatus according to claim 1, in which the light source is a discharge lamp, wherein the illumination lighting apparatus comprises:

a preheating circuit configured to supply a preheating current to an electrode of the discharge lamp such that a supply amount of the preheating current can be switched in a plurality of steps having at least a first preheating current and a second preheating current;

a timer configured to set a preheating time in which the preheating current is supplied to the preheating circuit; and a preheating controller configured to switch the supply amount of the preheating current output from the preheating circuit, wherein in relighting after lighting-OFF of the discharge lamp, the preheating controller switches the preheating circuit so as to supply the second preheating current as a relighting preheating current which is larger than the first preheating current supplied at lighting.

4. The illumination lighting apparatus according to claim 3, wherein in lighting-OFF of the discharge lamp, the preheating controller switches the preheating circuit so as to supply the first preheating current as a lighting-OFF preheating current which is smaller than the second preheating current.

5. The illumination lighting apparatus according to claim 4, wherein the timer sets a preheating stop time at which the supply of the preheating current is stopped, and wherein after the preheating stop time has elapsed in lighting-OFF of the discharge lamp, the preheating controller stops the supply of the lighting-OFF preheating current from the preheating circuit.

6. The illumination lighting apparatus according to claim 3, wherein the timer sets a first lighting preheating time and a second lighting preheating time as the preheating time, and wherein when a power supply is turned ON, the preheating controller switches the preheating circuit so as to supply the first preheating current as a first lighting preheating current until the first lighting preheating time has elapsed, and to supply the second preheating current as a second lighting preheating current which is larger than the first preheating current until the second lighting preheating time has elapsed after elapse of the first lighting preheating time.

7. The illumination lighting apparatus according to claim 3, wherein after the discharge lamp is lit, the preheating controller switches the preheating circuit so as to supply the first preheating current as a preheating current during lighting which is smaller than the second preheating current.

8. The illumination lighting apparatus according to claim 3, wherein the timer sets a time for supplying the relighting preheating current in relighting after lighting OFF of the discharge lamp to 0.5 seconds or shorter.

9. The illumination lighting apparatus according to claim 3, wherein the timer comprises a number counter configured to count a number of operations of supplying the second preheating current or a number of lighting-OFF signals based on the external signal, and wherein in accordance with the number, at least one of a supply time for supplying the second preheating current and a level of the second preheating current is changed.

10. The illumination lighting apparatus according to claim 3,
wherein the timer comprises a time counter configured to count the lighting time of the discharge lamp, and wherein in accordance with the lighting time, at least one of a supply time for supplying the second preheating current and a level of the second preheating current is changed.

11. An illumination apparatus, comprising:
the illumination lighting apparatus according to claim 1; and
the light source lit by an electric power supplied from the illumination lighting apparatus.

12. An illumination system, comprising:
the illumination apparatus according to claim 11; and
an external apparatus connected to the illumination apparatus.

* * * * *